(12) United States Patent
Siefken et al.

(10) Patent No.: US 11,244,681 B1
(45) Date of Patent: Feb. 8, 2022

(54) SYSTEM AND METHOD FOR DRIVE THROUGH ORDER PROCESSING

(71) Applicant: XENIAL, INC., Charlotte, NC (US)

(72) Inventors: Christopher Siefken, Charlotte, NC (US); William Wine, Charlotte, NC (US); Arjun Wadwalkar, Charlotte, NC (US); Brian Keith Jackson, Waxhaw, NC (US); Andrew Grindstaff, Charlotte, NC (US)

(73) Assignee: XENIAL, INC., Charlotte, NC (US)

( * ) Notice: Subject to any disclaimer, the term of this patent is extended or adjusted under 35 U.S.C. 154(b) by 0 days.

(21) Appl. No.: 17/325,871

(22) Filed: May 20, 2021

Related U.S. Application Data

(60) Provisional application No. 63/059,267, filed on Jul. 31, 2020.

(51) Int. Cl.
| | | |
|---|---|---|
| G10L 15/00 | (2013.01) | |
| G10L 15/22 | (2006.01) | |
| G06K 9/00 | (2006.01) | |
| G06Q 50/12 | (2012.01) | |
| G06Q 30/06 | (2012.01) | |
| H04N 7/18 | (2006.01) | |

(52) U.S. Cl.
CPC .......... *G10L 15/22* (2013.01); *G06K 9/00624* (2013.01); *G06Q 30/0635* (2013.01); *G06Q 50/12* (2013.01); *H04N 7/183* (2013.01); *G06K 2209/23* (2013.01)

(58) Field of Classification Search
CPC ...... G10L 15/22; G06Q 30/0641; G06F 3/167
See application file for complete search history.

(56) References Cited

U.S. PATENT DOCUMENTS

| | | | | |
|---|---|---|---|---|
| 5,357,596 | A * | 10/1994 | Takebayashi | G06F 3/16 |
| | | | | 704/251 |
| 2001/0002467 | A1* | 5/2001 | Ogo | G06Q 30/06 |
| | | | | 455/41.1 |
| 2006/0076397 | A1* | 4/2006 | Langos | G06Q 10/087 |
| | | | | 235/375 |
| 2015/0127493 | A1* | 5/2015 | Winkelman | G06Q 20/4012 |
| | | | | 705/26.81 |
| 2017/0200365 | A1* | 7/2017 | Baker, Sr. | G08G 1/144 |
| 2019/0108566 | A1 | 4/2019 | Coleman et al. | |
| 2019/0171711 | A1 | 6/2019 | Carpenter, II et al. | |

(Continued)

OTHER PUBLICATIONS

International Search Report and Written Opinion, International Application No. PCT/US2021/033379, dated Sep. 17, 2021, 12 pages.

*Primary Examiner* — Daniel Abebe
(74) *Attorney, Agent, or Firm* — Foley & Lardner LLP

(57) ABSTRACT

A system and a method for automating drive-thru orders are provided. In particular, a bridge board is provided that can integrate existing drive-thru hardware with computer devices executing machine learning models to detect and analyze speech from a drive-thru. The system and method employ vehicle tracking to account for vehicle behavior during its time at the drive-thru as well as enhanced vehicle analytics. Additionally, the system and method employ tools for assessing customer speed-of-service. Cameras and vehicle image analysis are used to link drive-thru and/or on-line food/beverage orders with vehicles entering the eatery property to accelerate food/beverage delivery to vehicle occupants.

20 Claims, 21 Drawing Sheets

(56) References Cited

U.S. PATENT DOCUMENTS

| | | | |
|---|---|---|---|
| 2019/0266561 A1* | 8/2019 | Koeppel | G06Q 10/0836 |
| 2020/0034848 A1 | 1/2020 | Seo et al. | |
| 2020/0167702 A1* | 5/2020 | Beaurepaire | G01C 21/3423 |
| 2020/0226667 A1* | 7/2020 | Kalaimani | G06F 3/167 |
| 2020/0311804 A1* | 10/2020 | Buckholdt | G06Q 30/0641 |

* cited by examiner

SYSTEM AND METHOD FOR DRIVE THROUGH ORDER PROCESSING

CROSS-REFERENCE TO RELATED APPLICATIONS

The present application claims the benefit of priority to U.S. Provisional Application No. 63/059,267 filed Jul. 31, 2020, the entire contents of which are incorporated herein by reference.

FIELD

The present disclosure relates to order processing for orders placed at a drive through (drive-thru).

BACKGROUND

Typical drive-thru delivery windows at eateries use manual order-entry processes to acquire and process customer orders.

SUMMARY

Manual entry processes can result in inconsistent or inaccurate results. An automated solution for drive-thru order processing is desirable, including audio processing that allows customers to verbalize orders without interacting with kiosks or other touch-based computer interfaces (e.g., including methods that avoid the need for a customer to touch interfaces outside the customer's own vehicle, reducing the spread of pathogens). To automate order taking at a drive-thru, the systems and methods described herein can integrate with existing drive-through systems to extract and provide customer audio data to an artificial intelligence model. The artificial intelligence model can be trained to recognize speech, and in some implementations can be a natural language processing model.

Further still, using detection techniques dependent on fixed points at a drive-thru paints a misleading and incomplete picture of actual order-related activity and vehicle behavior at a drive-thru. For example, the typical set-ups for drive-thru monitoring assume that a vehicle follows a fixed course on its service journey—e.g., its encounter with the drive-thru, from the drive-thru entry to exit—when in reality the course may not be fixed. As an example, an eatery worker (a mobile worker such as a "runner" or "line buster") may be sent to initiate order placement before a vehicle reaches a drive-thru window, or the vehicle may exit via an escape lane after the runner delivers the food to the vehicle (at some location other than the drive-thru window), or the vehicle may drive off due to an unacceptable wait time. For instance, an impatient driver may abandon the drive-thru before ordering, after ordering but before payment, or may even pay and then park his or her vehicle to enter the eatery and express dissatisfaction.

Fixed detection technologies (such as in-ground detection loops) rely on assumptions about the course taken by the vehicle on its service journey and use timestamps associated with fixed points along the journey. As fixed detection techniques cannot account for all of the locations where order placement, order payment or order fulfillment (as discussed in more detail below) may occur, the information gleaned from such detection is less valuable in understanding actual drive-thru performance. Nor does fixed-detection technology account for activity such as online ordering and subsequent pick-up at the drive-thru. Therefore, such techniques do not accurately represent the speed-of-service or actual phenomena at the drive-thru.

In at least one embodiment, a system for automating a drive-thru includes electronic circuitry configured to (1) receive a customer's voice signal at a drive-thru as customer audio information, (2) transmit the customer audio information to a voice recognition processor for voice recognition processing, (3) receive conversational prompts from the voice recognition processor, and (4) cause outputting of the conversational prompts to the customer.

In at least one embodiment, a system includes a voice recognition processor, wherein the voice recognition processor is configured to perform at least one of natural language processing, machine learning, or artificial intelligence.

In at least one embodiment, a voice recognition processor is remote from the electronic circuitry.

In at least one embodiment, the voice recognition processor is located more than 1 kilometer from the electronic circuitry.

In at least one embodiment, the voice recognition processor is configured to generate an offer to provide an alternative product than an initially selected product.

In at least one embodiment, the aforementioned electronic circuitry is configured to communicate with existing drive-thru base station equipment.

In at least one embodiment, the electronic circuitry is configured to filter out employee chatter.

In at least one embodiment, the electronic circuitry is configured to detect when a customer starts speaking.

In at least one embodiment, a system for automating a drive-thru is provided. The system includes at least one camera positioned at a drive-thru; and a processor system configured to (1) receive image information from the at least one camera, (2) identify at least one vehicle attribute from the image information, and (3) link the at least one vehicle attribute with a food and/or beverage order.

In at least one embodiment, the processor is configured to link the at least one vehicle attribute with a food and/or beverage order placed at the drive-thru.

In at least one embodiment, the processor is configured to link the at least one vehicle attribute with a food and/or beverage order placed online based on a vehicle attribute associated with the online order.

In at least one embodiment, the at least one vehicle attribute comprises at least one of a vehicle make, a vehicle model, or a vehicle color.

In at least one embodiment, a method includes detecting, by a first detector, a vehicle on a course; identifying at least one attribute of the vehicle; transmitting the at least one attribute and timing information corresponding to a time when the vehicle is detected to a processor; displaying, by the processor, information on a user interface including a depiction of the detected vehicle having the at least one attribute and the timing information; and updating the user interface in response to at least a change in an order status for an order associated with the vehicle.

In at least one embodiment, the at least one attribute comprises at least one of a vehicle make, a vehicle model, or a vehicle color.

In at least one embodiment, the aforementioned method further includes receiving audio data relating to the order; processing the audio data; and offering an alternative product to an occupant of the vehicle from a product identified in the order.

In at least one embodiment, the aforementioned method further includes associating a vehicle identifier relating to the at least one attribute with an order identifier relating to the order, and depicting a representation of both of the vehicle identifier and the order identifier in the user interface.

In at least one embodiment, the aforementioned method further includes (i) initiating timing of an encounter with the course when the vehicle is detected by the detector and (ii) terminating timing and terminating the depiction of the vehicle in the user interface when the vehicle is detected to exit the course.

In at least one embodiment, the aforementioned method further includes updating the user interface in response to an interaction between at least one occupant of the vehicle and an eatery worker at a location other than a drive-thru of the course.

In at least one embodiment, the order is an online order, and the processor is configured to associate a vehicle identifier relating to the at least one attribute with the online order so as to identify a customer who placed the online order as a presumptive occupant of the vehicle.

In at least one embodiment, the aforementioned method further includes transmitting information relating to the order to a natural language processor and to the user interface.

In at least one embodiment, the aforementioned method further includes providing, by the user interface, a notification when an elapsed time for an activity associated with the order exceeds a benchmark.

In at least one embodiment, the aforementioned method further includes depicting, on the user interface, a vehicle location, the at least one attribute, the timing information and the order status for each of a plurality of vehicles on the course.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustrations and a further understanding of the various aspects and implementations, and are incorporated in and constitute a part of this specification. Aspects can be combined and it will be readily appreciated that features described in the context of one aspect of the invention(s) can be combined with other aspects. Aspects can be implemented in any convenient form.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. The foregoing and other objects, aspects, features, and advantages of the disclosure will become more apparent and better understood by referring to the following description taken in conjunction with the accompanying drawings described below.

DETAILED DESCRIPTION

The various concepts introduced above and discussed in greater detail below may be implemented in any of numerous ways, as the described concepts are not limited to any particular manner of implementation. Examples of specific implementations and applications are provided primarily for illustrative purposes.

The present disclosure implements automated drive-thru detection and service techniques. The systems described herein provide an example bridge box that integrates existing drive-thru hardware with a processor that executes vehicle detection models and speech recognition models.

System Overview

Figure 10:
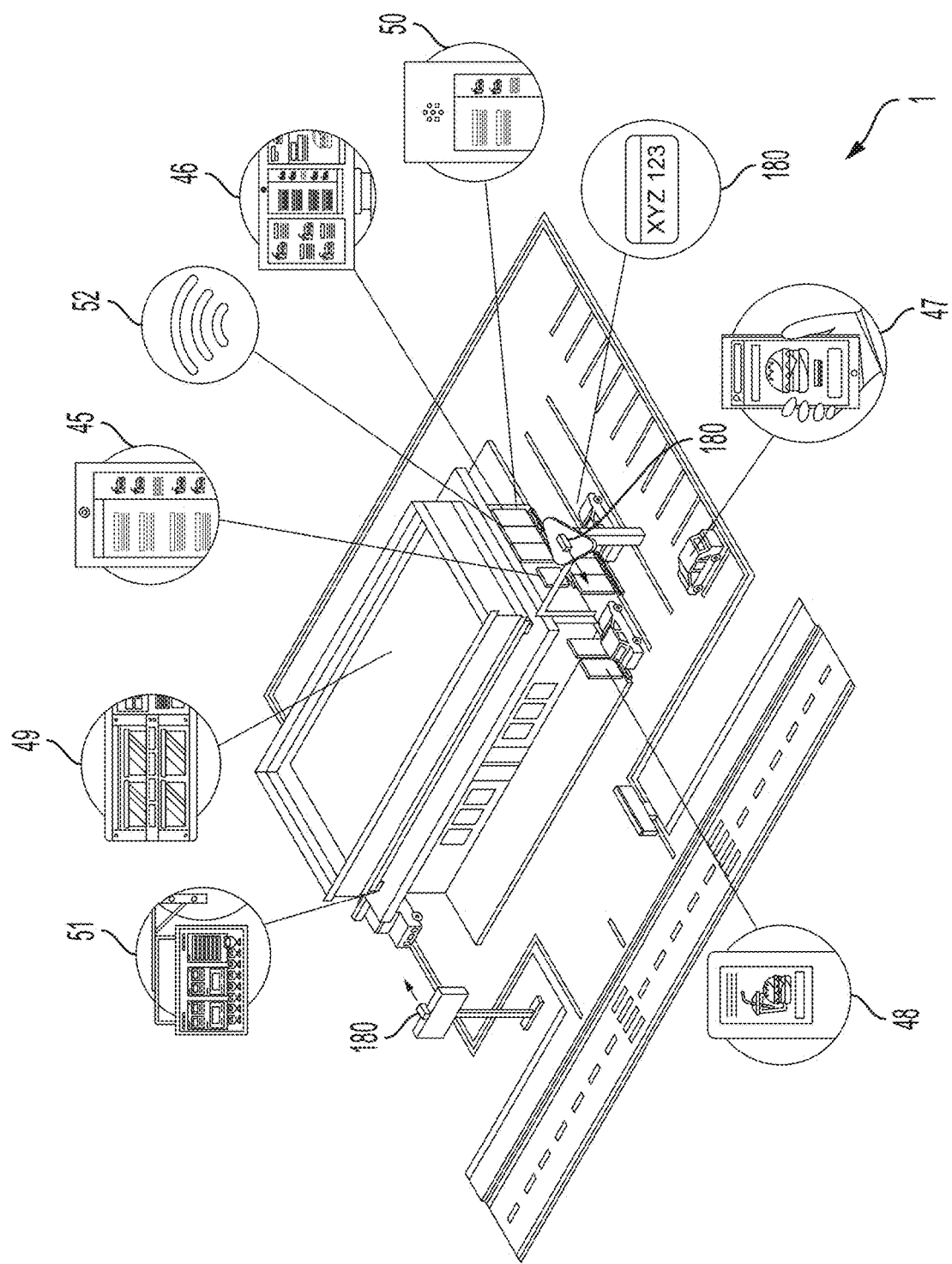
FIG. 10 is a depiction of a drive-thru system in accordance with one or more implementations.

Referring first to FIG. 10, this figure illustrates an overall system for automating drive-thru orders in accordance with at least one embodiment. The components shown in FIG. 10 are described below in further detail in connection with various other figures. FIG. 10 depicts a representative layout of an eatery premises where the eatery features a standalone building, a parking lot, and a drive-thru (DT) with entry and exit lanes. As shown in FIG. 10, the drive-thru system 1 may include a plurality of cameras 180, including a camera 180 oriented toward the drive-thru entrance and a camera 180 oriented toward the drive-thru exit. As indicated in FIG. 10, the cameras 180 acquire information used to identify at least one vehicle attribute, as described in more detail below.

The drive-thru system 1 may further include at least one engagement point where a customer engages with the eatery for ordering. For example, a pre-sale kiosk 48 may be provided at a location separate from the drive-thru window or a digital menu board 46, in addition to or instead of a self-order kiosk 45. The drive-thru system 1 may additionally feature an order confirmation display 50. In some embodiments, the customer may engage with the eatery via a mobile phone 47 provided with an application program interface for online ordering. In addition, the drive-thru system 1 includes one or more user interfaces, e.g., a user interface of a terminal 51 at the eatery and/or a point-of-sale (PoS) system 49 at a kitchen in the eatery to facilitate processing of drive-thru orders. The drive-thru system 1 may be provided with various wireless communication technology (e.g., with beacons 52) to facilitate interaction between the above-mentioned components and the customer.

Figure 1:
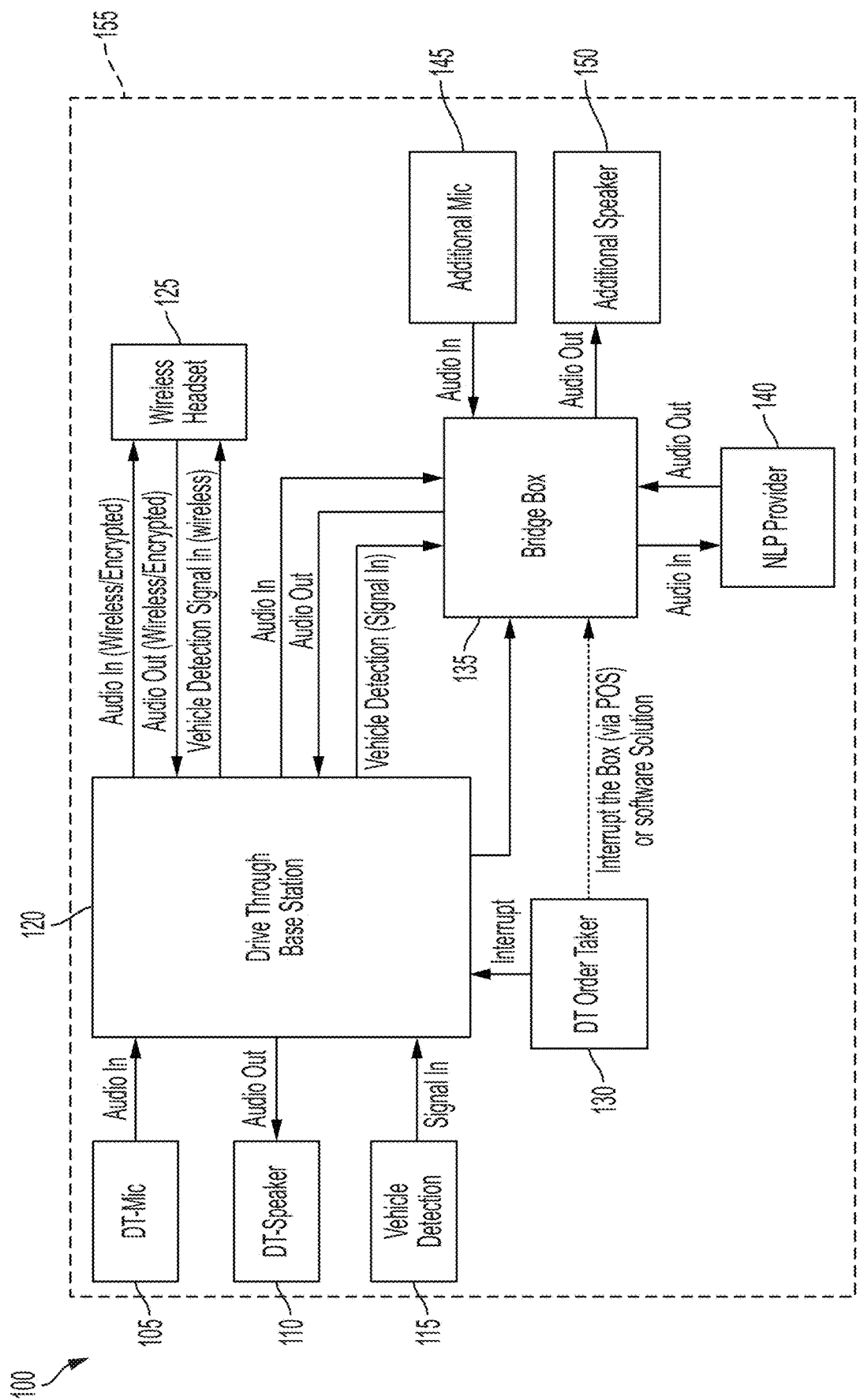
FIG. 1 illustrates a high-level block diagram of an example system including a bridge box for automating drive-thru orders.

FIG. 1 illustrates a high-level block diagram of an example system 100 for automating drive-thru orders. The system 100 includes at least one drive-thru microphone 105, at least one drive-thru speaker 110, at least one vehicle detection device (detector) 115, at least one base station 120, at least one drive-thru order taker 130, at least one wireless headset 125, at least one bridge box 135, which may be implemented as electronic circuitry and is discussed further below, at least one natural language processing (NLP) provider 140, at least one additional microphone 145, and at least one additional speaker 150.

The drive-thru microphone 105 (hereinafter the "DT microphone 105") can be any type of microphone capable of receiving and translating speech from a user into an electronic signal. The DT microphone 105 can be positioned, for example, at a point in a drive-thru course, such as an order station. In some implementations, the DT microphone 105 may be integrated into one or more drive-thru devices, such as a drive-thru menu sign 46 or a drive-through speaker assembly with the drive-thru speaker 110. The DT microphone 105 can capture speech from a user and transmit the corresponding electronic signal to the base station 120 for processing.

In some implementations, the DT microphone 105 can include one or more filters or noise canceling circuits that reduce background noise (engine noise, honking, wind, etc.) or other unwanted frequencies present in the electronic signal. In some implementations, the DT microphone 105 can detect when a user is speaking into the speaker and send a signal to the base station 120 indicating a user is speaking.

The drive-thru speaker 110 (hereinafter the "DT speaker 110") can be any type of speaker capable of producing audio suitable for a drive-thru environment. For example, the audio produced by the speaker should be loud enough such that a user in a running vehicle can hear the audio. The DT speaker 110 can receive electronic audio signals from the base station 120 and produce sound based on the audio signals. In some implementations, the DT speaker 110 may be integrated into one or more drive-thru devices, such as a drive-thru menu sign or a drive-through speaker assembly with the DT microphone 105.

The vehicle detection device 115 can be any device capable of detecting that a vehicle is present at a particular position in a drive-thru course or loop (e.g., the path from entry to exit for the drive-thru). For example, the vehicle detection device 115 can be a vehicle ground course detector switch that produces a vehicle detection signal when a vehicle (e.g., a car, a truck, a van, a sport-utility-vehicle (SUV), etc.) is detected by the ground course detector switch (such as a detection loop).

In some implementations, in lieu of a physical, in-pavement switch, the vehicle detection device 115 can include one or more cameras 180 that provide image streams to a processor that executes a computer vision model trained to detect vehicles. The cameras can be positioned at predetermined locations in the drive-thru course, and when a vehicle approaches the camera, the computer vision model executing on the processor can detect the vehicle in the image stream and produce a vehicle detection signal. The cameras may be positioned at one or more of: an entry of the drive-thru course, at least one intermediate point along the drive-thru course, and an exit of the drive-thru course.

By implementing the vehicle detection device 115 by a plurality of cameras, the overall system requires less construction activity—such as less tearing up of asphalt to install detection switches and/or loops—than conventional approaches. In particular, the cameras are movable and may be positioned at different points along the drive-thru course, and thus can capture activities such as when a vehicle moves in an unexpected or unpredictable flow—for example, when the vehicle drives off or uses an "escape" lane of the drive-thru, when the vehicle is given instructions by an eatery worker to proceed in a particular direction, and/or when the vehicle is parking.

This contrasts with approaches dependent on detectors at fixed positions in the pavement, where vehicles must follow defined patterns of movement in order for monitoring and assessment of drive-thru activity. Further, the vehicle detection device 115 may be set up in any number of drive-thru configurations. In some implementations, the vehicle detection device 115 can be a motion sensor that captures movement of objects about the size of a vehicle. The motion sensor can be positioned at a predetermined location in a drive-thru course, and produce the vehicle detection signal when motion from a vehicle is detected. The vehicle detection signal generated by the vehicle detection device 115 can be communicated to the base station 120. In some embodiments, the camera may be configured to receive image data that the bridge box 135 can process to determine how many occupants are in the vehicle.

The base station 120 can be any type of drive-thru base station that receives electronic audio signals from the DT microphone 105 and the vehicle detection signal from the vehicle detection device 115. The base station 120 can include one or more processors, a wireless transmitter, and a wireless receiver. The base station 120 can communicate with wireless devices, such as the wireless headset 125 using the wireless transmitter and the wireless receiver. In some implementations, the base station 120 can communicate using one or more wireless standards, including Bluetooth or wireless fidelity (WiFi), among others.

In some embodiments, the base station 120 can communicate using beacon technology, e.g., via one or more beacons 52. The base station 120 can act as a pass-through device that encrypts the electronic audio signals received from the DT microphone 105 and the vehicle detection signal using a processor, and transmits the encrypted signals to the wireless headset 125. The base station 120 can receive encrypted audio signals via the wireless receiver, and use the processor to decode or decrypt the encrypted data to generate an electronic audio signal. The base station 120 can transmit the decrypted audio signal to the DT speaker 110, causing the DT speaker 110 to produce audio. The base station 120 can provide wired outputs of the audio signals received from the DT microphone 105 as well as the vehicle detection signal to a bridge box 135. The base station 120 can receive an additional audio signal from the bridge box 135, which can be provided to the DT speaker 110.

The DT order taker 130 can be a computing device that can send interrupt signals to the bridge box 135. The interrupt capability may be implemented as a switch or button to allow the DT order taker 130 to stop the bridge box 135 from being engaged in order-taking.

The wireless headset 125 can be a headset that includes a speaker, a microphone, and a processor. The wireless headset 125 can include a wireless transmitter and a wireless receiver. The wireless headset 125 can communicate wirelessly with the base station 120 via the wireless transmitter or the wireless receiver using a wireless protocol, such as Bluetooth or WiFi. The wireless headset 125 can receive encrypted audio data from the base station 120 via the wireless receiver. Using the processor, the wireless headset 125 can decode or decrypt the encrypted data to generate an electronic audio signal. The electronic audio signal can be provided to a speaker in the wireless headset 125, allowing a user of the wireless headset to hear speech from the drive-thru course. Likewise, the microphone on the wireless headset 125 can receive user speech data, which can be encrypted by the processor in the wireless headset 125 and transmitted to the base station 120, allowing a customer in the drive-thru course to hear audio from the user of the wireless headset 125.

The bridge box 135 is a computing device which allows a user to select various microphone and speaker configurations by software commands. The commands also allow selection of microphone and speaker parameters, such as amplifier parameters, amplifier gain, preamp gain, servo amplifier loop parameters, zero crossing control, as well as other audio parameters. This allows the system to be configured for different drive-thru configurations (for example, number of lanes depending on the time of day) as well as for desired audio quality. The bridge box 135 is configured to receive multiple inputs, including audio inputs, and outputs for the drive-thru, and processes image data (e.g., video data) from the drive-thru to aid in timing calculations as discussed further below. The processing may occur locally, by the bridge box 135, or remotely (e.g., by cloud computing system 155 discussed herein). The bridge box 135 is configured to facilitate the collection of data from multiple sources (e.g., audio, video and ground-loop sources). The bridge box 135 can receive data from the components depicted in the diagram 100 to perform the actions described herein.

The bridge box 135 can include one or more processors and a memory. The bridge box 135 can receive the audio signals provided via the DT microphone 105, and the vehicle detection signal, from the base station 120. In addition, the bridge box 135 can receive audio signals from one or more additional microphones 145. The bridge box 135 can automate drive-thru order taking by sending the audio data received via the DT microphone 105 from the base station 120 to the NLP provider 140. In response to these audio signals, the bridge box 135 can receive conversational prompts from an artificial intelligence model executing on the NLP provider 140. In some implementations, the NLP provider 140 can form a part of the bridge box 135. The bridge box can translate these conversational prompts into one or more audio signals using text-to-speech processing techniques, and provide these audio signals to the bridge box for playback by the DT speaker 110. In addition to receiving audio data from the DT microphone 105, the bridge box 135 can receive audio data from the wireless headset 125 via the bridge box 120.

In some implementations, the bridge box 135 can communicate with one or more cameras (not pictured) that are positioned in the drive-thru course. The one or more cameras can provide a stream of images to the bridge box 135, which can perform an object detection technique on the images to detect and classify vehicles in the drive-thru course and/or quantify a number of occupants therein. For example, the bridge box 135 can recognize a vehicle (e.g., vehicle make, vehicle model, vehicle color, etc.) when a vehicle drives into a parking lot or the drive-thru course. The bridge box 135 can, in some implementations, communicate with one or more computer networks (not pictured), and receive data relating to online orders that have been performed using a web-based interface. Using the vehicle classification data, the bridge box 135 can associate an online order with a detected vehicle, for example, by identifying similar vehicle information in a user profile corresponding to the online order. In such implementations, this can eliminate the need for a drive-thru lane, and allow an order to be delivered anywhere in a parking lot of an establishment.

In addition, the bridge box 135 can receive additional audio data from the additional microphone 145, which can be positioned in the drive-thru course as described herein. The bridge box 135 can facilitate voice ordering from the audio data received from the additional microphone 145, the base station 120, or the wireless headset 125. In some implementations, the bridge box 135 can connect to multiple additional microphones 145 to better detect and classify vocal data from users in the drive-thru course. The bridge box 135 can implement one or more filtering algorithms that can reduce, or attenuate, audio from other sources, such as employees at the establishment or equipment. The bridge box 135 can monitor the audio data received from multiple sources to determine when a customer begins speaking.

In some implementations, the bridge box 135 can automatically direct a customer order by communicating fully generated conversation data to a driver or passenger of the drive-thru course using data from the NLP provider 140. The bridge box 135 can send an employee's voice data (e.g., received from the wireless headset 125 via the base station 120) to the NLP provider 140 for processing. In some implementations, the bridge box 135 can detect ordering conditions for upselling opportunities, and generates speech data to upsell orders to customers. For example, if the customer is ordering a quantity of items beyond that typically associated with a single order for a single customer, and the bridge box 135 identifies a number of vehicle occupants greater than a threshold number (e.g., greater than two), the bridge box 135 may generate speech data to offer a family combo meal that offers greater revenue to the drive-thru provider. In this manner, based on the information gleaned from the processed audio data, the bridge box 135 may cause an alternative product to be offered for consideration for purchase by the vehicle occupant than the product initially identified by the vehicle occupant.

The NLP provider 140 can be a provider of a natural language processing service, which can execute in a remote, or a cloud environment. The natural language provider 140 can receive audio signals from the bridge box 135 and perform processing on the audio signals. In response to the audio signals, the NLP provider 140 can generate response audio signals and transmit the response signals to the bridge box 135. In some embodiments, the processing of audio signals may take place as described in U.S. Patent Application Publication 2020/0273089 published Aug. 27, 2020, the entire contents of which are incorporated herein by reference for the techniques and methods set forth therein. In some embodiments, the natural language processing may be performed in conjunction with an automated (digital) assistant implemented as a voice application program interface (API), as described in the aforementioned application publication. The voice API may dialogue with a customer and cause an output in the form of an automated assistant for any or all parts of the ordering process.

Figure 5:
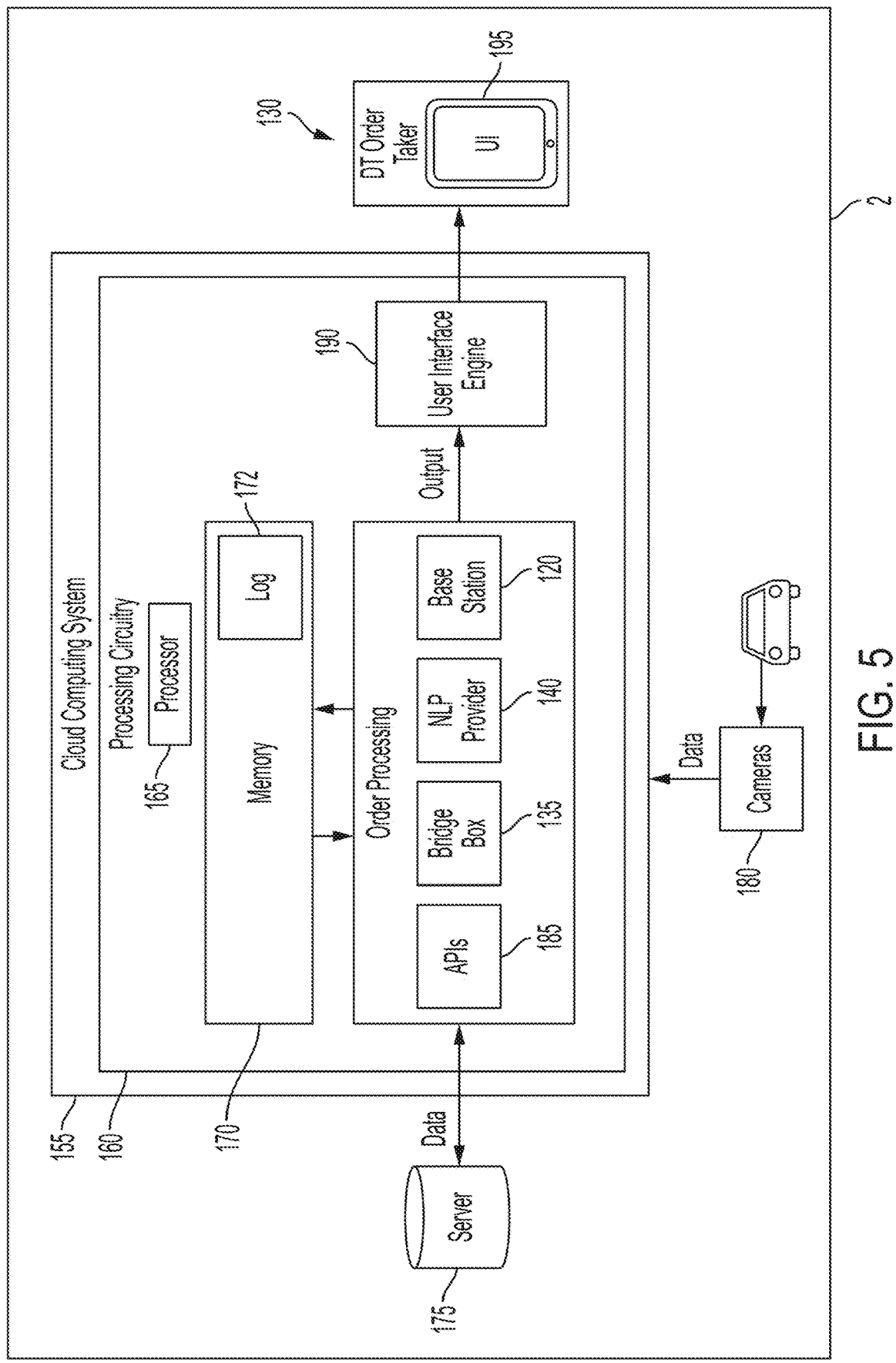
FIG. 5 is a schematic diagram of a system according to some embodiments.
Figure 12:
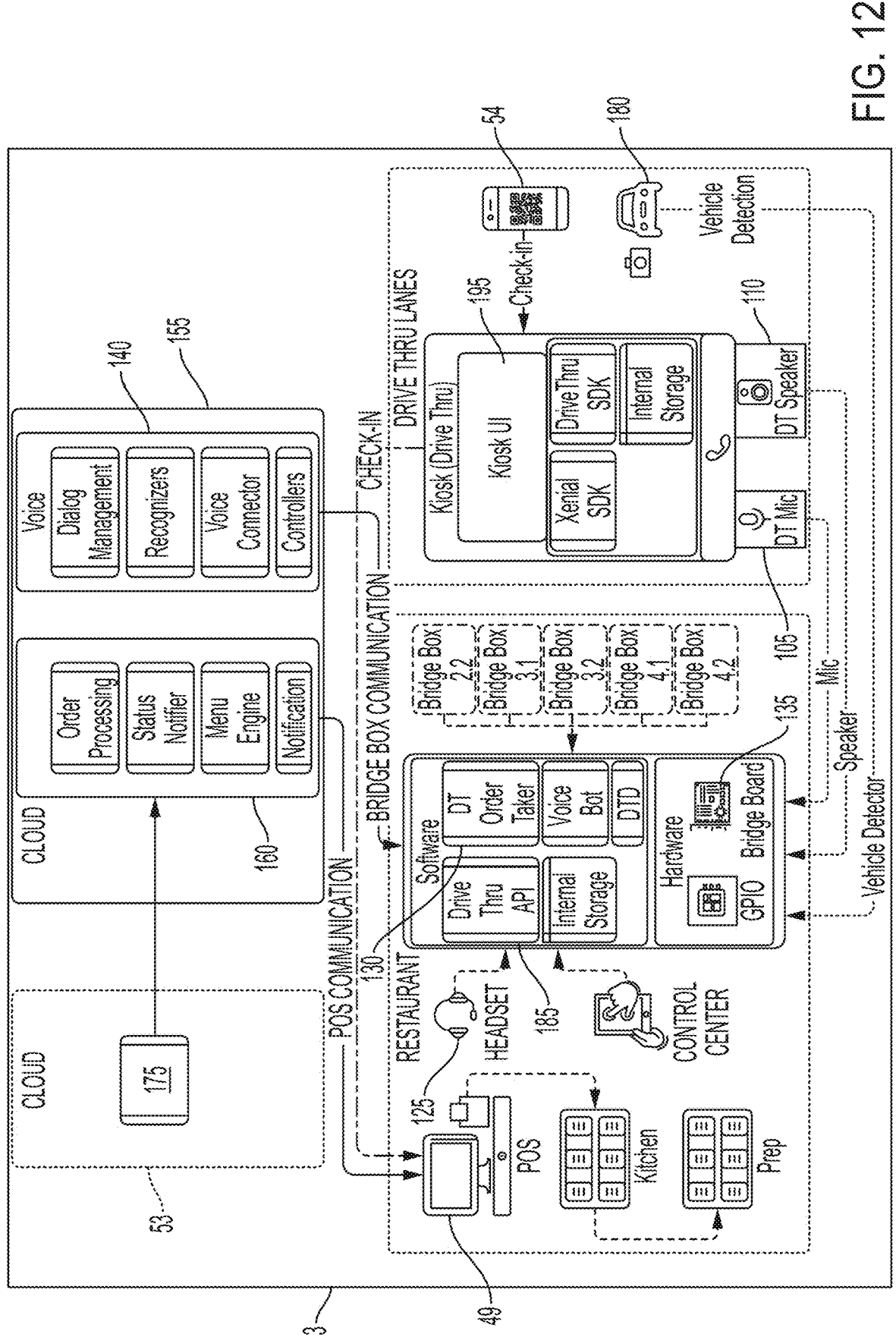
FIG. 12 is a depiction of a system in accordance with one or more implementations.

FIG. 12 depicts a drive-thru system 3 according to at least one embodiment, which is similar in certain aspects to that shown in FIG. 5, where like reference numerals refer to like elements. In the system shown in FIG. 12, however, in addition to the cloud computing network 155, other cloud computing capability may be provided. In some embodiments, the NLP provider 140 may reside in cloud computing network 155 and/or cloud computing network 53 shown in FIG. 12; while in other embodiments, the NLP provider 140 may reside in the cloud computing network 155, the cloud computing network 53, and the bridge box 135. In some embodiments, audio signal data, individual store location data, franchise data and enterprise data may be distributed between cloud computing networks 53, 155. In some embodiments, the bridge box 135 may not process all NLP-related data or provide all NLP-related processing, but rather may send at least some of the audio signals to cloud computing network 155 for some or all of the processing. In some embodiments, bridge box 135 may perform processing on first audio data, whereas processing of second audio data may occur in the cloud computing network 155.

Further, in some embodiments, the additional microphone 145 can be any type of microphone capable of receiving and translating speech from a user into an electronic signal. In some implementations, the additional microphone 145 can be one or more independent directional microphone arrays. The additional microphone 145 can be positioned, for example, at a point in a drive-thru course, such as an order station. In some implementations, the additional microphone 145 may be integrated into one or more drive-thru devices, such as a drive-thru menu sign or a drive-through speaker assembly with the additional speaker 150. The additional microphone 145 can capture speech from a user and transmit the corresponding electronic signal directly to the bridge box 135 for processing. In some implementations, the additional microphone 145 can include one or more filters or noise canceling circuits that reduce background noise or other unwanted frequencies present in the electronic signal. In some implementations, the additional microphone 145 can detect when a user is speaking into the speaker and send a signal to the bridge box 135 indicating a user is speaking. The additional microphone 145 can be, for example, a DA-250Q microphone array.

The additional speaker support 150 can be any type of speaker capable of producing audio suitable for a drive-thru environment. For example, the audio produced by the speaker should be loud enough such that a user in a running vehicle can hear the audio. The additional speaker support 150 can receive electronic audio signals from the bridge box 135 and produce sound based on the audio signals. In some implementations, the additional speaker support 150 may be integrated into one or more drive-thru devices, such as a drive-thru menu sign or a drive-through speaker assembly with the additional microphone 145.

In some embodiments, the voice bridge box 135 is communicated with the DT base station 120 to receive both customer and eatery worker audio information, including events such as when a customer begins speaking. The voice bridge box 135 is configured to connect to one or more cameras 180 for speed of service evaluation and image recognition. Further, the voice bridge box 135 is configured to execute machine learning or other artificial intelligence applications for image recognition and voice ordering. The bridge box 135 is configured to connect to independent directional microphone arrays as described above for capturing better voice quality and may further be configured to filter out employee chatter so that only customer voice data is sent to the NLP provider 140, which may be located remove from (e.g., more than 1 kilometer from the bridge box 135 in some embodiments). In some embodiments, the NLP provider 140 may not be remote from the bridge box 135.

In some embodiments, one or more of the NLP provider 140, one or more third party application program interfaces (APIs) 185, a processor of the bridge box 135, and a point-of-sale (PoS system) 130 implemented as the drive-thru (DT) order taker mentioned above, and additional system componentry may be communicated with each other through a cloud computing system 155. Cloud computing system 155 can include processing circuitry, memory, one or more processors, etc., as described in greater detail below. Cloud computing system 155 generally includes processing circuitry for performing the tasks, methods, and functionality described herein, according to some embodiments. Cloud computing system 155 can be implemented on a remote processor, processing circuitry (e.g., at a single location) or can be distributed among different remote processing circuitry. Cloud computing system 155 may be communicated with a server 175 (e.g., a remote server) that may store data from one or more of the bridge box 135, the base station 120 or the cameras 180. In some embodiments, server 175 may be provided in further cloud computing network 53.

The cloud computing system 155 is shown in greater detail in FIG. 5, according to some embodiments. Cloud computing system 155 includes processing circuitry 160 including a processor 165 and memory 170. Processor 165 may be a general purpose or specific purpose processor, an application specific integrated circuit (ASIC), one or more field programmable gate arrays (FPGAs), a group of processing components, or other suitable processing components. Processor 165 is configured to execute computer code or instructions stored in memory 170 or received from other computer readable media (e.g., CDROM, network storage, a remote server, etc.).

The memory 170 may be configured to store therein a database including a log 172 of historical drive-thru information, where the processor 165 is configured to access the log 172 to run analytics on the drive-thru dataset, e.g., to determine trends in speed-of-service, conduct statistical processing, etc. In some embodiments, timing information and/or other information stored in log 172 (e.g., other transaction information) may be compared against customer satisfaction surveys sent to the customer (e.g., via one of the third party APIs 185) or performance reviews of the eatery as a whole (e.g., for assessments by a franchisor). For example, a franchisor may use data from multiple drive-thrus at different establishments in a franchise and compare store-to-store information to assess metrics of interest, e.g., speed-of-service. In particular, data collected by memory 170 and stored, e.g., in log 172, may be utilized to evaluate performance against goals for particular transaction types and workflows (e.g., a goal or benchmark that a beverage be delivered within a certain time period after order placement). Further still, the collected data from the NLP provider 140 may be used to evaluate individual eatery worker performance.

Memory 170 may include one or more devices (e.g., memory units, memory devices, storage devices, etc.) for storing data and/or computer code for completing and/or facilitating the various processes described in the present disclosure. Memory 170 may include random access memory (RAM), read-only memory (ROM), hard drive storage, temporary storage, non-volatile memory, flash memory, optical memory, or any other suitable memory for storing software objects and/or computer instructions. Memory 170 may include database components, object code components, script components, or any other type of information structure for supporting the various activities and information structures described in the present disclosure. Memory 170 may be communicably connected to processor 165 via processing circuitry 160 and may include computer code for executing (e.g., by processor 165) one or more processes described herein. When processor 165 executes instructions stored in memory 170, processor 165 generally configures cloud computing system 155 to complete such activities.

The processor 165 is configured to process information from one or more of the APIs 185, the bridge box 135, the NLP provider 140 and the base station 120 to construct a virtual real-time environment. The virtual environment captures events and activities as they occur in real-time (or with only a slight delay) at the drive-thru. For example, the virtual environment takes into account information received from the one or more cameras 180, such that when a first vehicle pulls into the parking lot of the drive-thru, the virtual environment is updated to reflect the presence of the first vehicle. By using inputs from the bridge box 135, the virtual environment of the processor 165 is updated as events unfold during the service journey of the first vehicle, from the entry point of the vehicle to its departure from the parking lot. The processor 165 may correlate a detected location of the vehicle based on information from the one or more cameras 180 to timing information from timer functionality of the processor 165 and/or a timer of the bridge box 135.

In some embodiments, the virtual environment is realized by a user interface engine 190. The user interface engine 190 synthesizes data from the processor 165 and causes at least a subset of that data to be displayed on a user interface 195. The user interface 195 may include a display of the DT Order Taker 130. In some embodiments, a customer may initiate a transaction via a mobile phone 47 that has an application program interface which interacts with the DT Order Taker 130. In some embodiments, the customer may, after entering the premises of the eatery, engage with a pre-sale kiosk 48 (e.g., to communicate regarding special offers, seasonal items, etc.). In some embodiments, an application on the mobile phone 47 may allow a customer to interact with the eatery (e.g., to "check in" or place an order) using a QR code 54 as shown in FIG. 12.

In some embodiments, the DT Order Taker 130 may be a portable device such as a tablet or mobile phone, or alternatively may be a workstation, terminal 51 or kiosk, such as a kiosk 45 shown in FIG. 10. In some embodiments, the user interface engine 190 causes the user interface 195 to be accessible via a plurality of devices, such as a terminal in the eatery and a portable device which may be held by a runner, i.e., an eatery worker located at the drive-thru who is tasked with delivering orders to waiting vehicles in the drive-thru or parking lot.

In some embodiments, the user interface engine 190 may determine which subset of information from the processor 165 is to be displayed depending on the particular medium or format for the destination device. For example, a runner holding a handheld device may have a user interface that contains information tailored to the runner's tasks (e.g., lane occupant information and the next n meals to be delivered, where n=1–10) in contrast to what is displayed at a terminal inside the eatery. As a further example, user interface 195 may depict, for a PoS 49 in a kitchen of the eatery, a subset of information including timing information, a vehicle type and a vehicle color, together with order information. By displaying this information, the need for manual entry of vehicle attribute information is avoided.

In some embodiments, the DT order taker 130 may be implemented as software that is executable by one or more existing PoS systems. The POS systems include, but are not limited to, the Iris PoS made by Xenial, Inc. of Charlotte, NC, the Aloha PoS made by NCR Corporation of Atlanta, GA, or the SICOM Encounter made by SICOM of Landsdale, PA, for example.

System Architecture

Figure 2A:
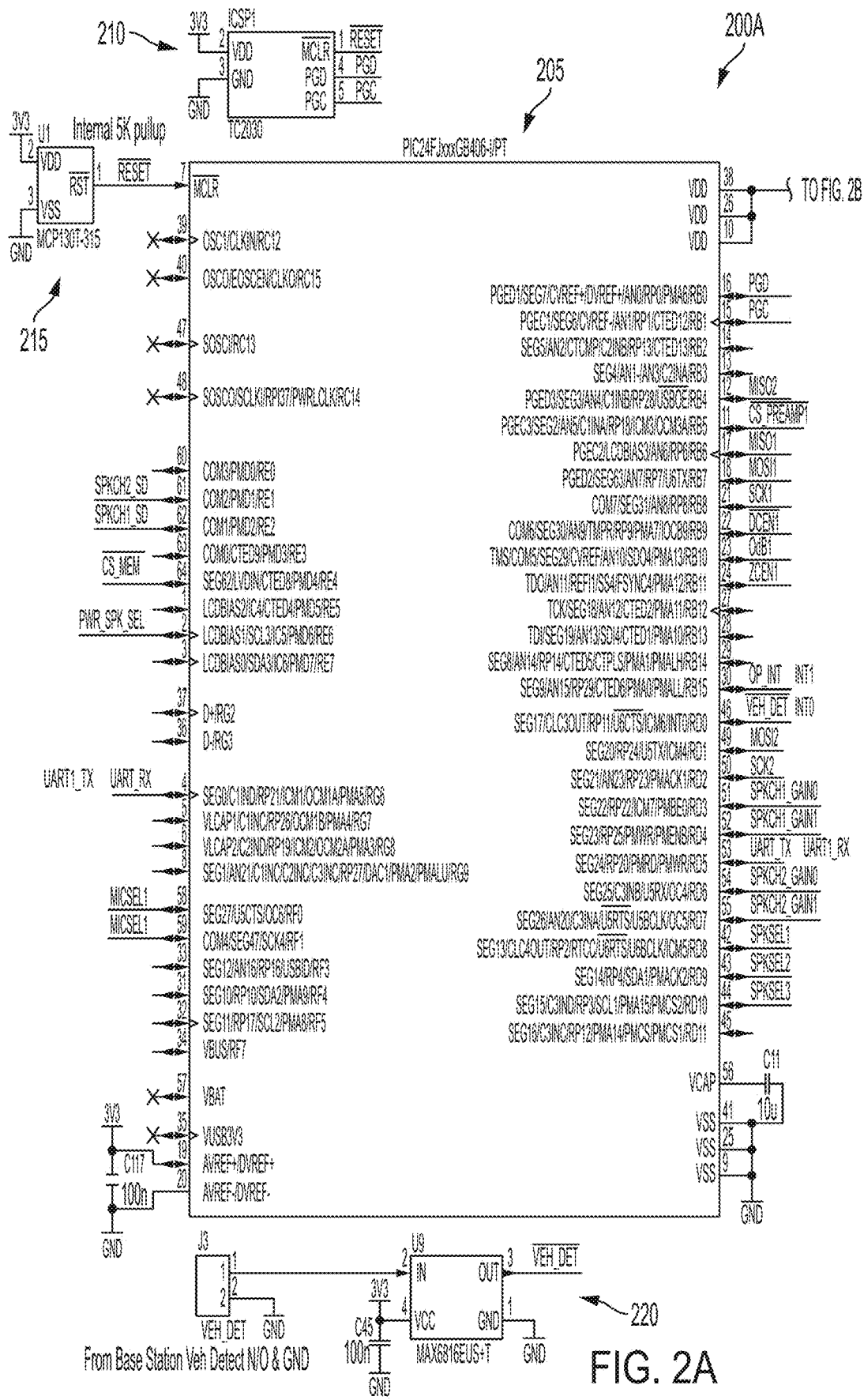
FIG. 2A illustrates schematically at least one example circuit diagram for electronic components of the bridge box shown in FIG. 1, in accordance with one or more implementations.
Figure 2B:
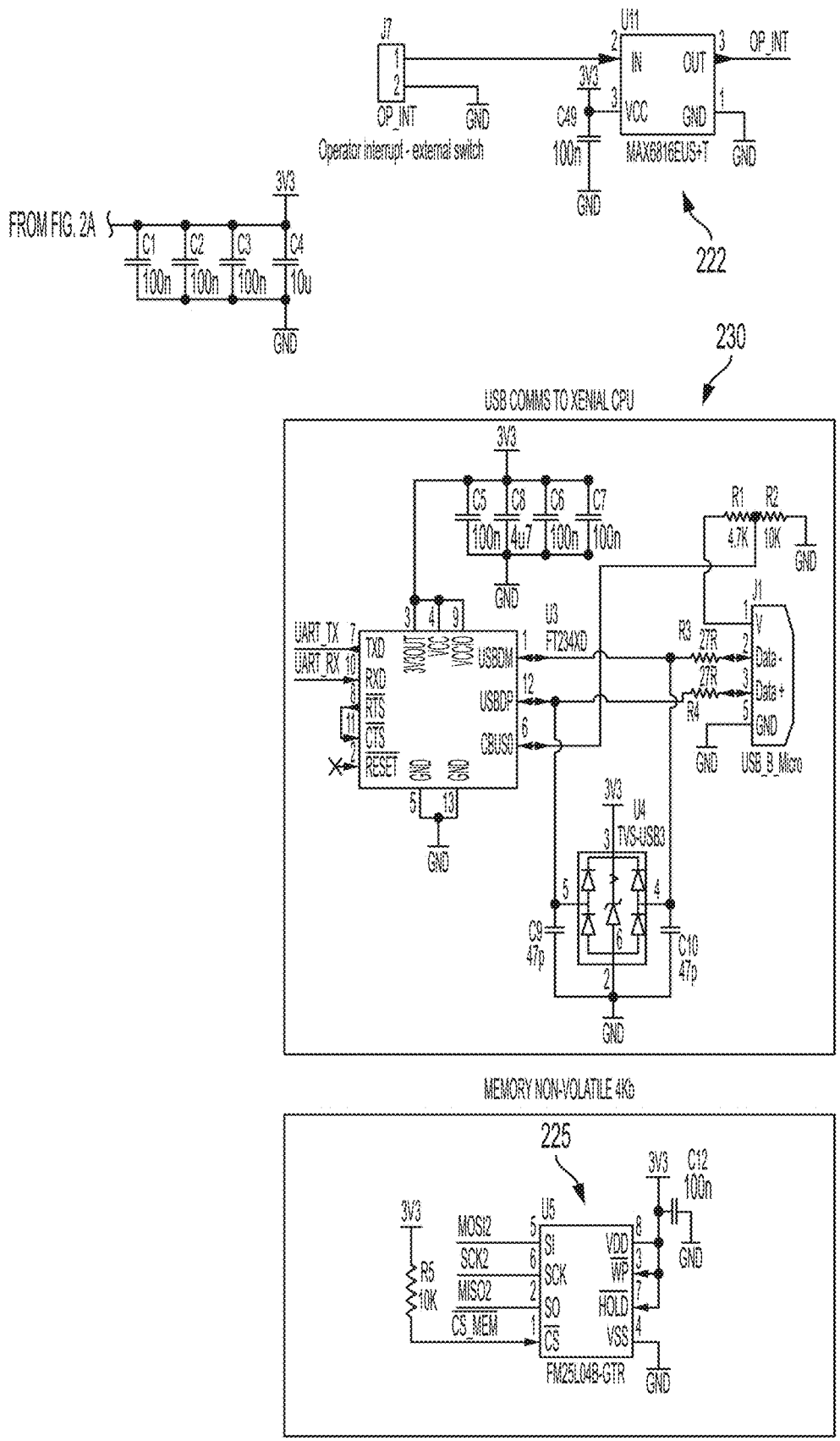
FIG. 2B illustrates schematically at least one example circuit diagram for electronic components of the bridge box shown in FIG. 1, in accordance with one or more implementations.
Figure 2C:
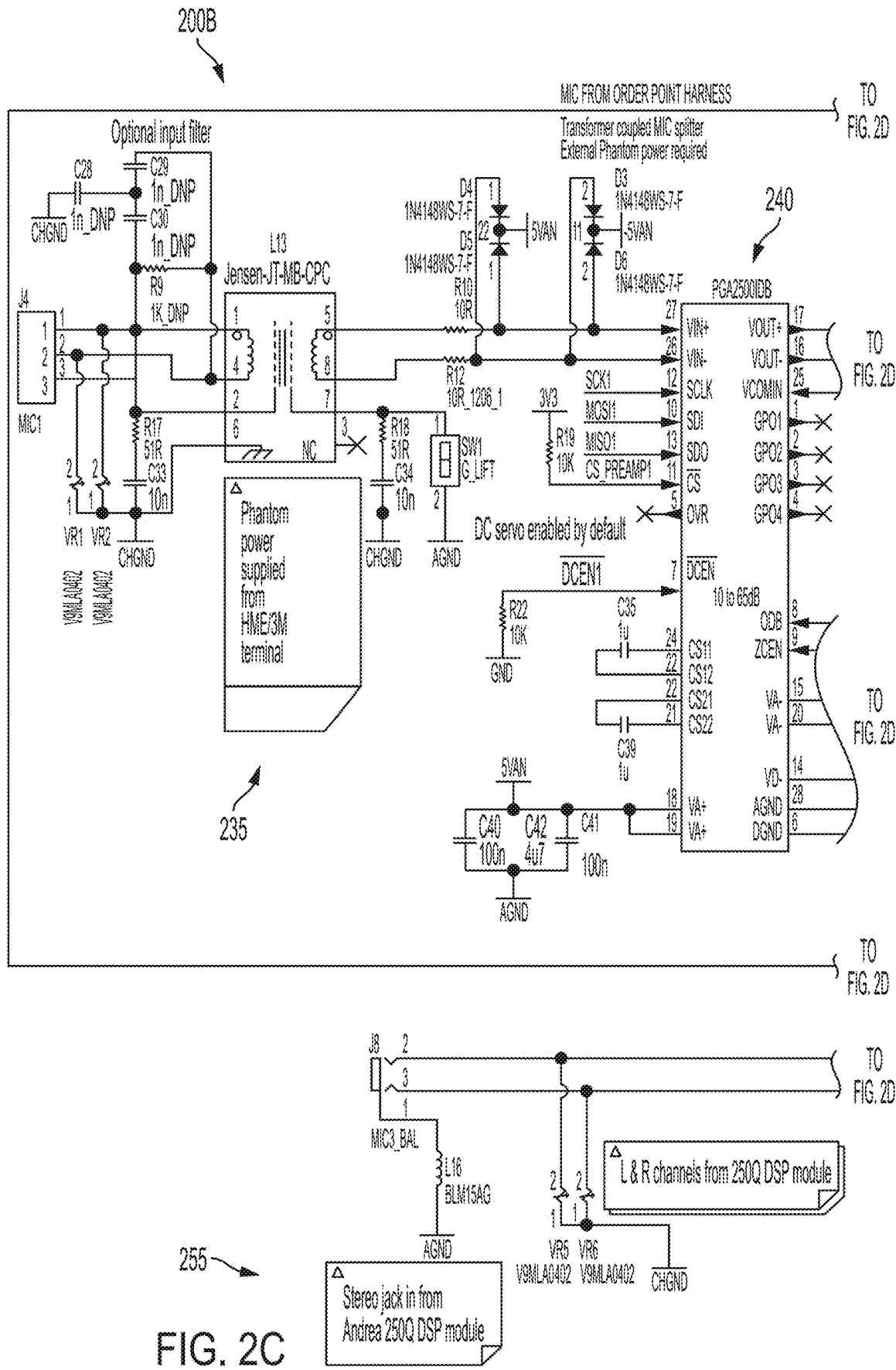
FIG. 2C illustrates schematically at least one example circuit diagram for electronic components of the bridge box shown in FIG. 1, in accordance with one or more implementations.

FIGS. 2A, 2B, and 2C illustrate schematic views of example circuit diagrams for electronic components (implemented as electronic circuitry) of the bridge box shown FIG. 1, in accordance with one or more implementations. Referring to FIG. 2A, depicted is an example circuit diagram 200A of a circuit that forms a part of the bridge box 135. The circuit diagram 200A includes a microcontroller 205, a debug interface 210, a reset controller 215, a signal interface 220, an operator interrupt interface 222, an external memory 225, and a universal serial bus (USB) interface 230.

The microcontroller 205 is configured to carry out remixing and processing of audio signals, e.g., according to various programmable settings. Exemplary settings, which are programmable as commands to the bridge box 135, and their potential implementations and applications are shown below in Table 1 (where "ch" denotes "channel").

| Firmware Setting 1 | Firmware Setting 2 | Features |
|---|---|---|
| Order point speaker source ☒ | Base station line in control ☒ | Propriety operating system |
| Ch 1 amplifier control ☐ | Ch 2 amplifier control ☒ | SDK/API to manipulate voice communication board in real time |
| Ch 1 amplifier control (order point speaker) ☐ | Ch 2 amplifier control (external speaker) ☐ | Broadcasting (e.g., Voice AI Digital Assistant is broadcast to kitchen speaker at eatery) |
| Ch 1 amplifier gain control ☐ | Ch 2 amplifier gain control ☐ | Listening mode activated |
| Microphone preamp gain ☒ | Read microphone preamp gain ☐ | Stop AI Digital Assistant; permit manual takeover |
| Enable DC servo ☐ | Control zero crossing ☐ | Turn on/off drive-thru speaker |
| Control MIC channel 1 output to CPU ☒ | Control MIC ch 2 (external MIC) output to CPU ☐ | Turn on microphone array |

The microcontroller 205 can be any type of microcontroller or embedded microprocessor capable of executing instructions from a memory. For example, the microcontroller 205 can be a PIC microcontroller. In some implementations, the memory can be internal to the microcontroller 205, and in some implementations, the memory from which instructions are accessed can be the memory 225. The microcontroller 205 may include timer circuitry so as to time events of interest at the drive-thru. The microcontroller 205 can include one or more serial interface, including a two-wire interface (TWI), a serial peripheral interface (SPI), and a general purpose input/output (GPIO) interface, among others.

The microcontroller 205 can receive data from and transmit data to external devices using the USB interface 230. The USB interface 230 can act as an interface between an external processing device, such as the computer shown in FIGS. 4A and 4B, and the microcontroller 205. The debug interface 210 can be a connector that connects to a debug interface for the microcontroller 205. The debug interface 210 can be used to communicate firmware data or to debug the microcontroller 205, for example, via an external debug tool (not pictured). The reset controller 215 can generate a reset signal for the microcontroller 205 when the circuit powers on. The reset controller 215 can maintain the reset signal for a predetermined amount of time to allow the internal circuitry of the microcontroller 205 to become configured for regular use.

The signal interface 220 can be a signal protection chip that isolates an external electronic signal from the electronic circuitry shown in FIG. 2A. A corresponding signal can be produced by the signal interface 220 that is compatible (e.g., by amount of voltage or current, etc.) with the components of the circuit shown in the circuit diagram 200A. As shown, the signal interface 220 can receive the vehicle detection signal from a base station, such as the base station 120 detailed herein in connection with FIG. 1.

The operator interrupt interface 222 can be a signal protection chip that isolates an external electronic signal from the electronic circuitry shown in FIG. 2A. A corresponding signal can be produced by the operator interrupt interface 222 that is compatible (e.g., by amount of voltage or current, etc.) with the components of the circuit shown in the circuit diagram 200A. As shown, the operator interrupt interface 222 can receive an external signal from an operator switch, which can trigger a corresponding interrupt of the microcontroller 205. The external memory 225 can connect to the microcontroller via a serial interface or a parallel interface. The external memory 225 is configured to store the settings shown in Table 1 above.

Referring to FIG. 2B, depicted is an example circuit diagram 200B of a circuit that forms a part of the bridge box 135. The circuit depicted in the diagram 200B is a microphone amplifier circuit. The circuit diagram 200B includes a microphone input circuit 235, a microphone pre-amplifier integrated circuit (IC) 240, a differential line receiver 245, a digital switch array 250, and an audio input 255. The microphone input 235 can include a microphone connector, one or more filters (e.g., capacitors, inductors, resistors, etc.). The microphone input 235 can receive microphone input, for example, from the base station 120 or from the DT microphone 105. In some implementations, the microphone input 235 can have a transformer that electrically isolates (e.g., via magnetic induction) signals from the microphone connector and the microphone pre-amplifier IC 240. The microphone pre-amplifier IC 240 can be any type of microphone pre-amplifier IC, such as a PGA2500IDB circuit. The microphone pre-amplifier IC 240 can receive microphone signals as input from the microphone input 235, and produce a pre-amplified signal between −1V and 1V that maintains the fidelity of the input signal. The pre-amplified signal can be provided as input to the differential line receiver 245.

Figure 2D:
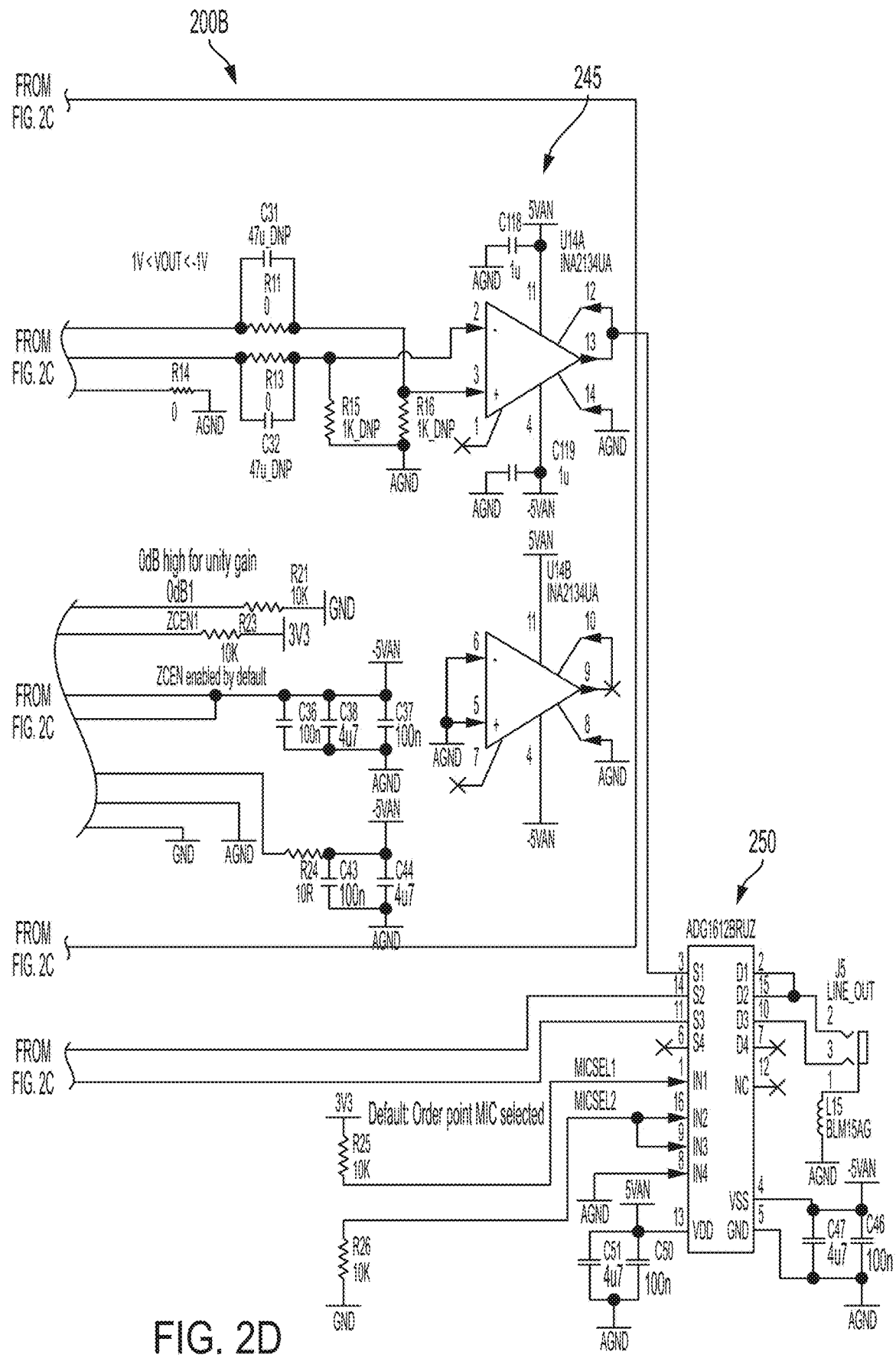
FIG. 2D illustrates schematically at least one example circuit diagram for electronic components of the bridge box shown in FIG. 1, in accordance with one or more implementations.

Referring to FIG. 2D, in some embodiments, the differential line receiver 245 can amplify the signal received from the microphone pre-amplifier IC 240, for example, to a voltage level between −5V and 5V. The amplified signal can be provided to the switch array 250. The switch array 250 can select between the amplified microphone signal and a signal from the audio input 255 to provide to an audio output of the circuit. The audio input 255 can be connected, for example, to the additional microphone 145 described herein above. As shown, the switch array 235 is wired to provide the amplified microphone signal as an output. In some implementations, GPIO signals from the microcontroller 205 can cause the switch array 250 to switch between providing the amplified microphone signal as an audio output and the audio input 255 as the audio output. In some implementations, the amplified microphone signal can be used to provide a voice activity detection signal to the microcontroller 205 or another computing device. The voice activity detection signal can indicate that the microcontroller 205 or the other computing device should being processing the audio input from the microphone.

Referring to FIG. 2C, depicted is an example circuit diagram 200C of a circuit that forms a part of the bridge box 135. The circuit depicted in the diagram 200C is a speaker amplifier circuit. The diagram 200C can include an audio line-in 265, a switch array 270, a first audio amplifier IC 275, and a second audio amplifier IC 280, an audio line out 285, an output connector 290, and a relay switch 295.

Figure 2E:
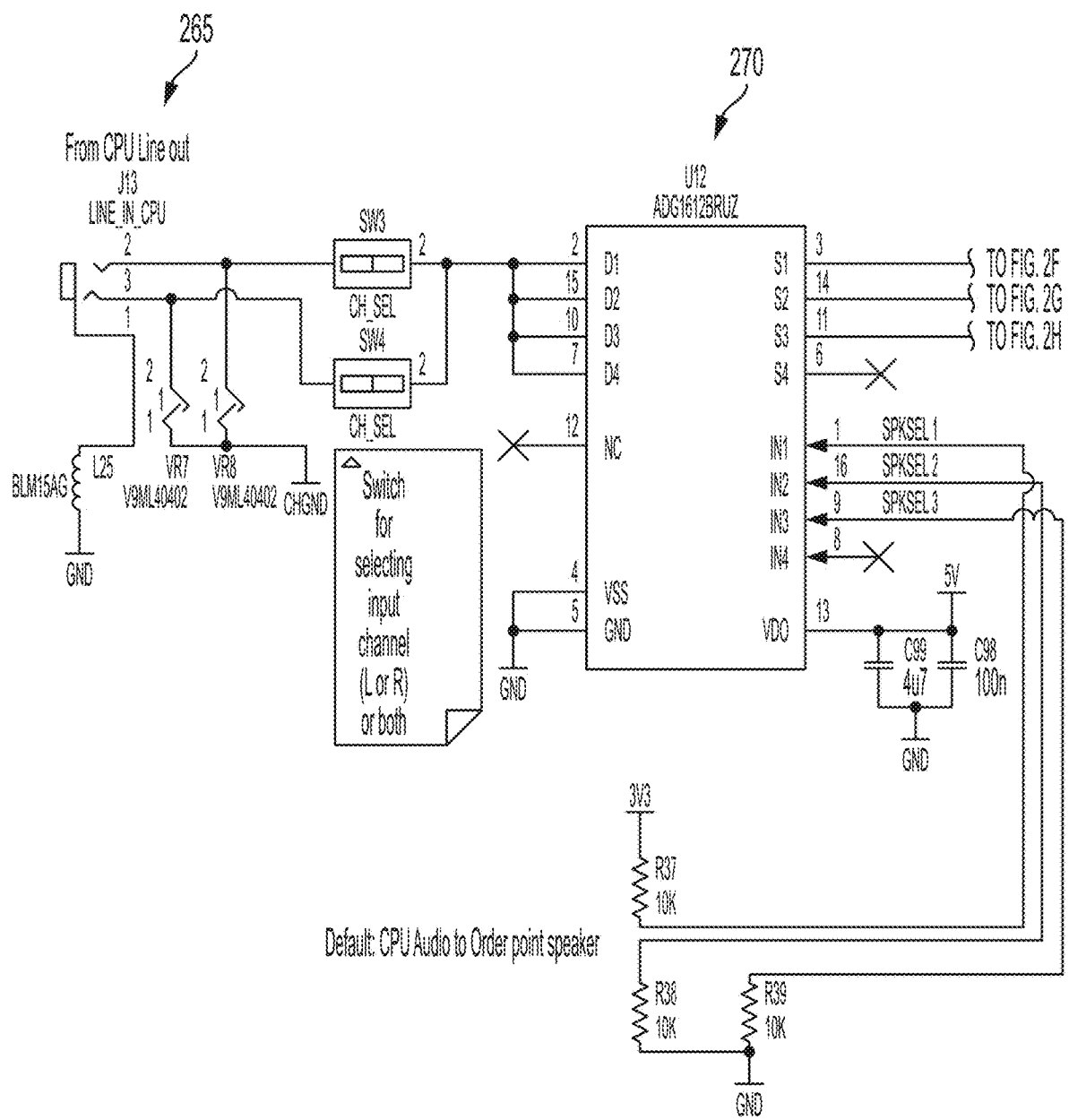
FIG. 2E illustrates schematically at least one example circuit diagram for electronic components of the bridge box shown in FIG. 1, in accordance with one or more implementations.
Figure 4A:
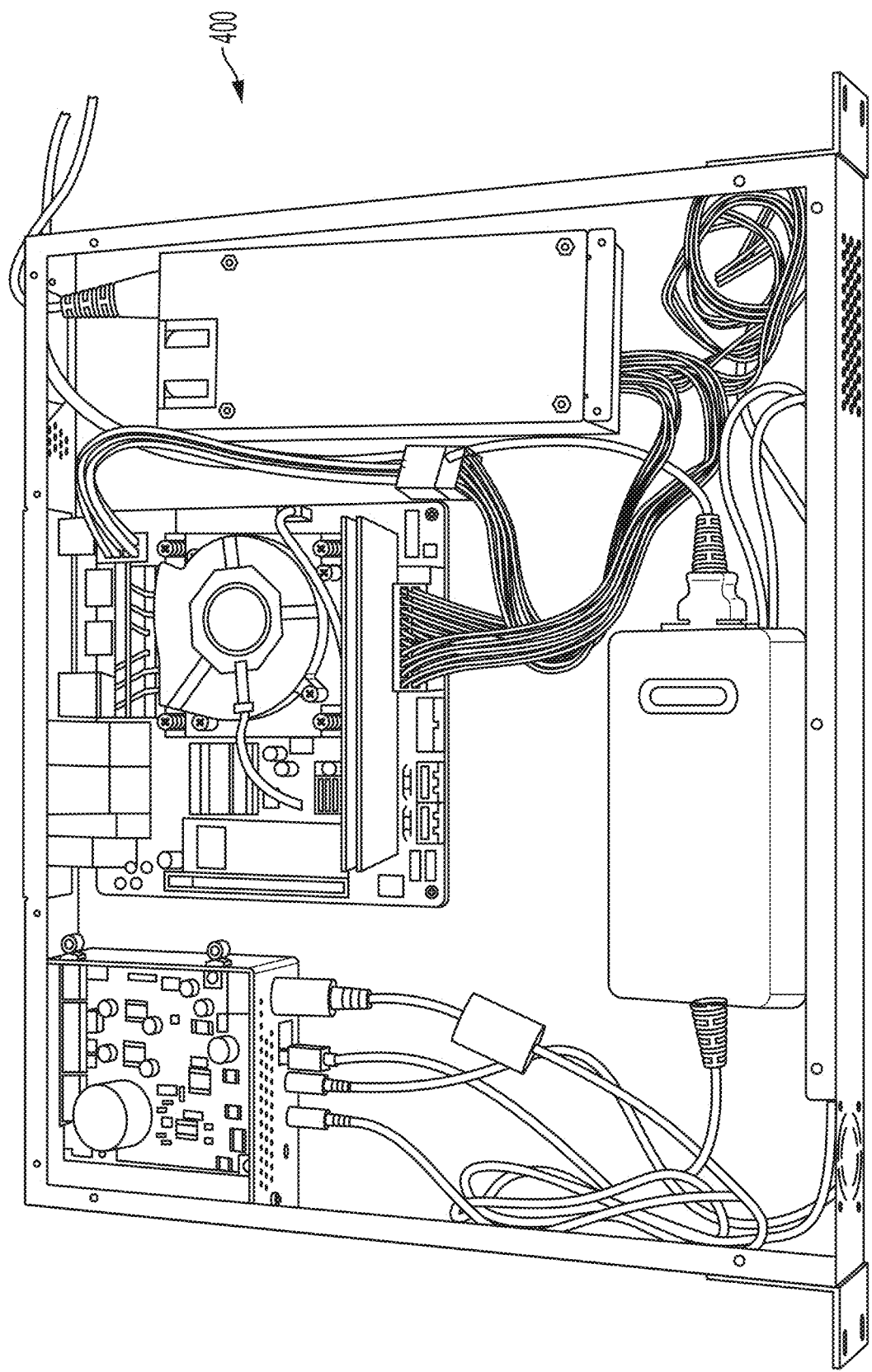
FIG. 4A illustrates a top view of an example system implementing the example bridge box illustrated in FIG. 1, in accordance with one or more implementations.
Figure 4B:
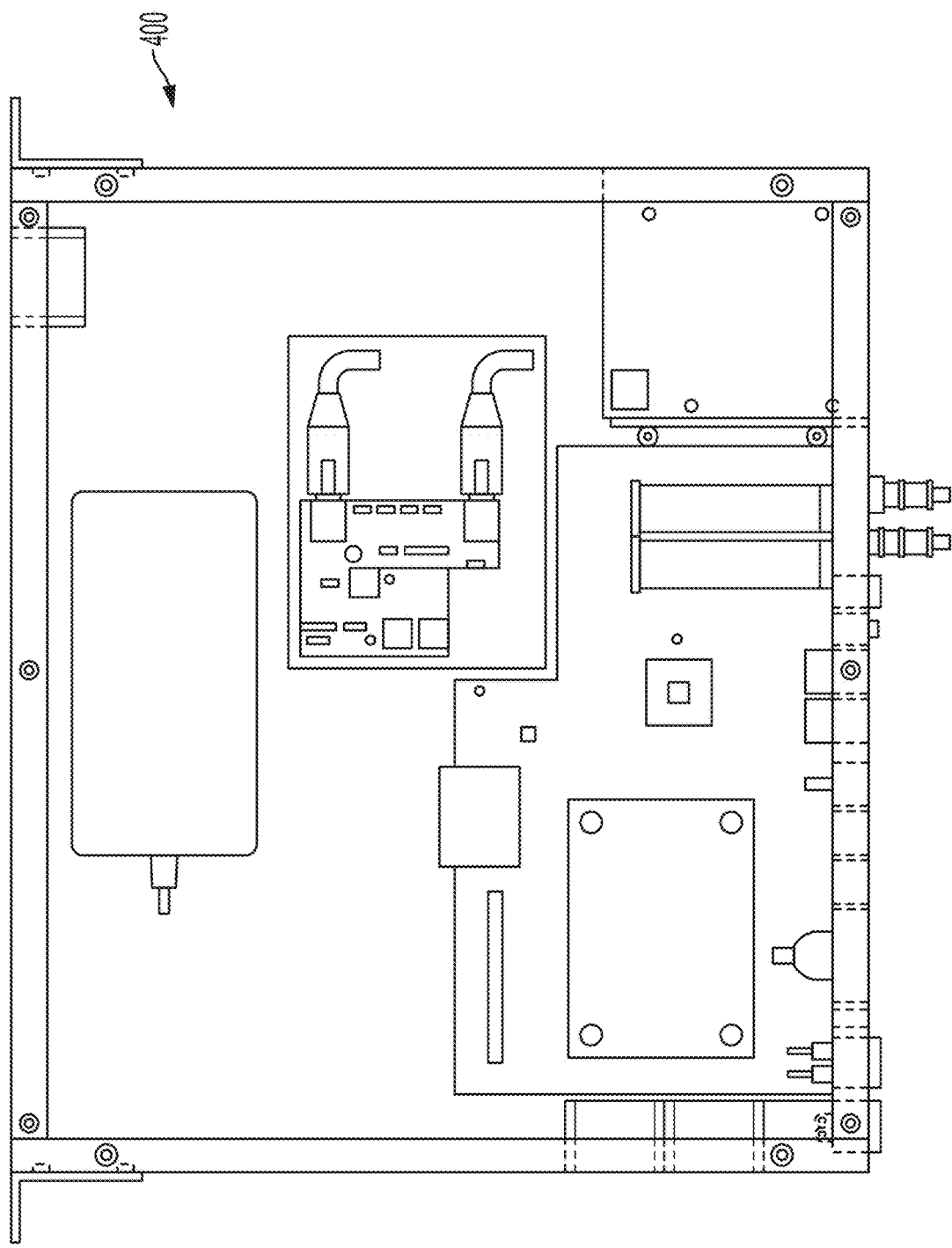
FIG. 4B illustrates a top view of the example system of FIG. 4A, in accordance with one or more implementations.

Referring to FIG. 2E, the audio line-in 265 can include one or more connectors, such as a line-in connector, that receives a wire or cable electrically coupled to a source of an audio signal, such as the computer shown in FIGS. 4A and 4B. In some implementations, the audio line-in 265 can include one or more switches for selecting an input channel (e.g., left input, right input, or both). The signals received from the audio line-in 265 are provided as input to the switch array 270. As shown, the switch array 270 is wired to provide the signal from the audio line-in 265 as input to the first audio amplifier IC 275 and the second audio amplifier IC 280, which is shown in FIG. 2G. The switch array 270 also connects to the audio line out 285 shown in FIG. 2H, which can connect to an audio input of the base station 120. In some implementations, GPIO signals from the microcontroller 205 can cause the switch array 275 to switch between providing the audio line-in signal to the first audio amplifier IC 275, the second audio amplifier 280, and the audio line-out 285.

Figure 2F:
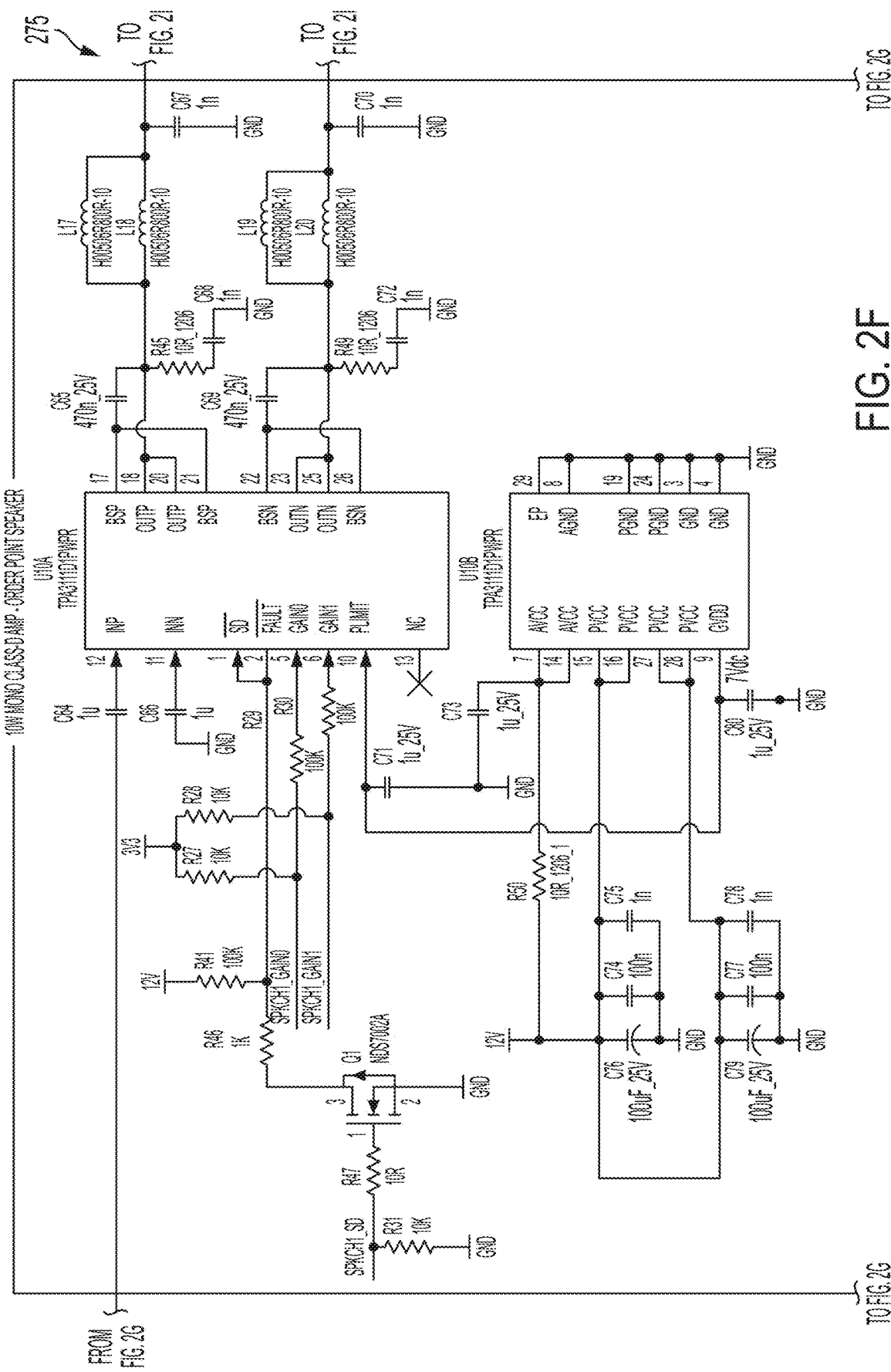
FIG. 2F illustrates schematically at least one example circuit diagram for electronic components of the bridge box shown in FIG. 1, in accordance with one or more implementations.
Figure 2G:
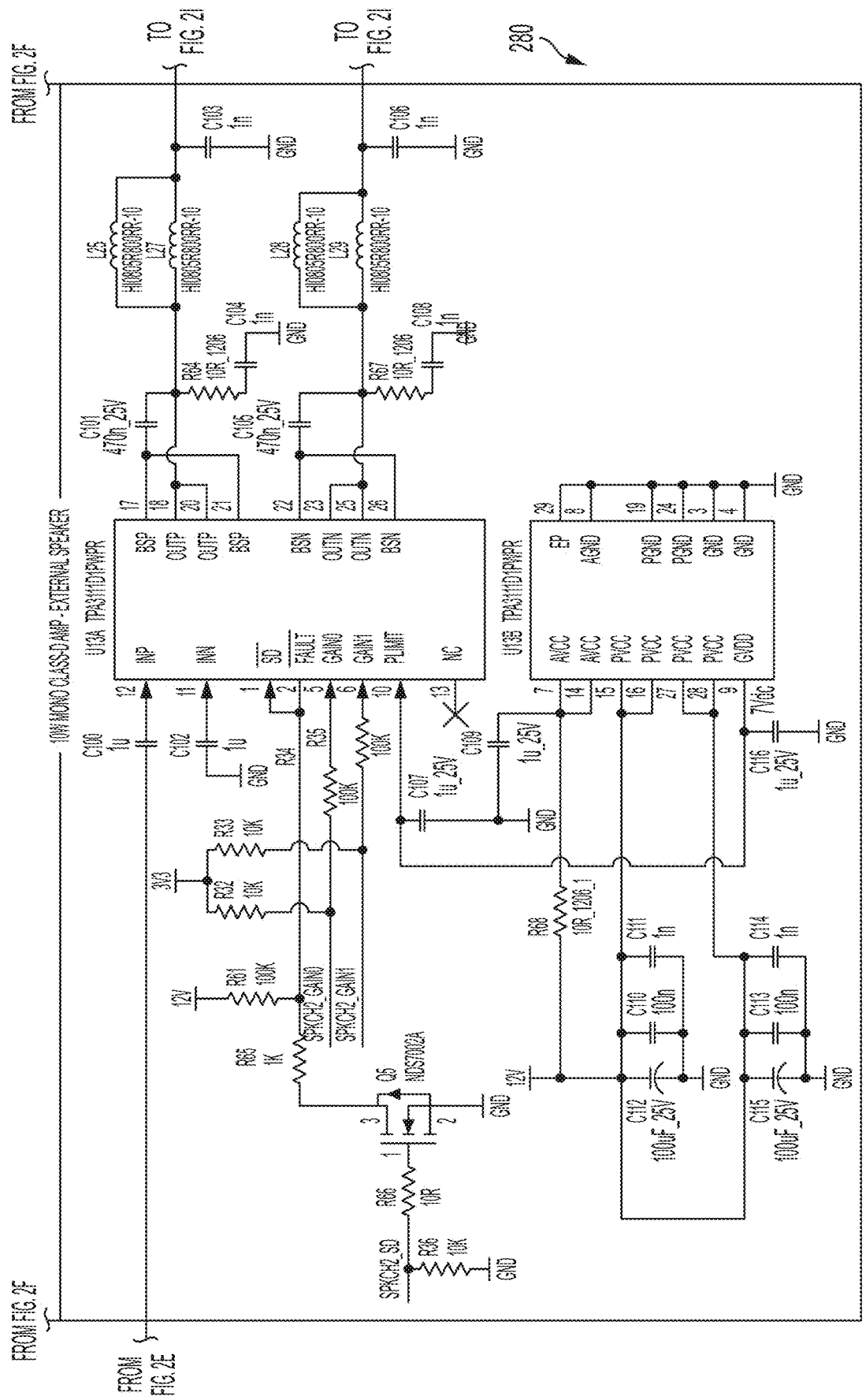
FIG. 2G illustrates schematically at least one example circuit diagram for electronic components of the bridge box shown in FIG. 1, in accordance with one or more implementations.
Figure 2H:
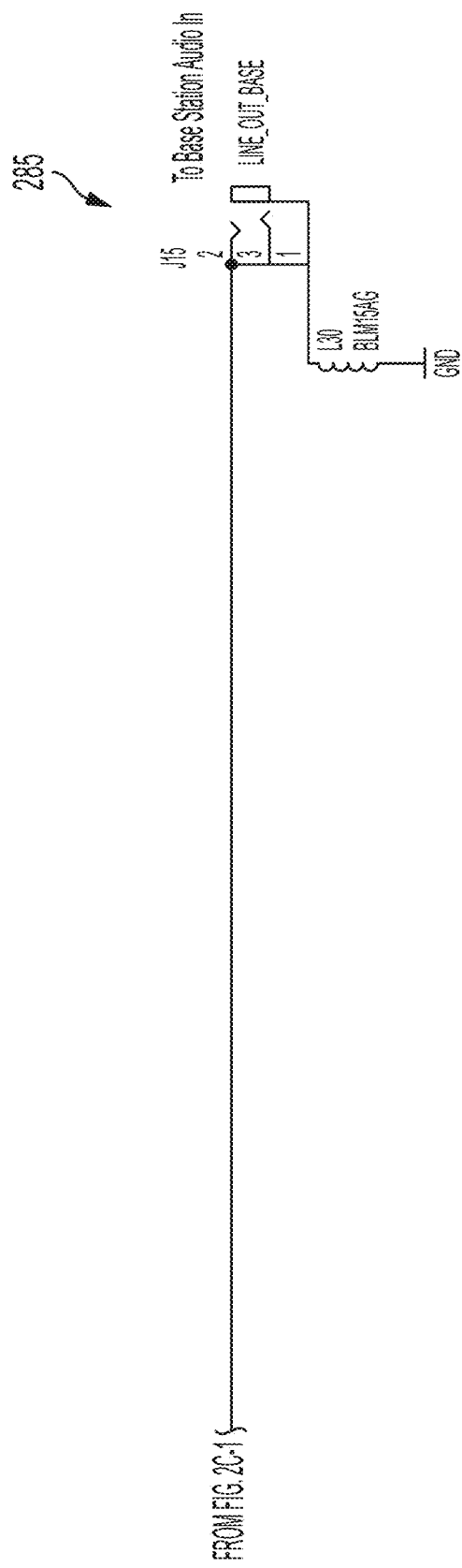
FIG. 2H illustrates schematically at least one example circuit diagram for electronic components of the bridge box shown in FIG. 1, in accordance with one or more implementations.

Referring to FIG. 2F, the first audio amplifier IC 275 can receive the audio input signal from the audio line-in 265 via the switching array 270. The first audio amplifier IC 275 can receive one or more gain signals from the microcontroller 205. The first audio amplifier IC 275 can be any type of audio amplifier, including the TPA3111D1PWPR 10 watt mono class-D audio amplifier. The first audio amplifier IC 275 can amplify signals received from the switching array 270 and provide an amplified audio output signal to the relay switch 295.

Figure 2I:
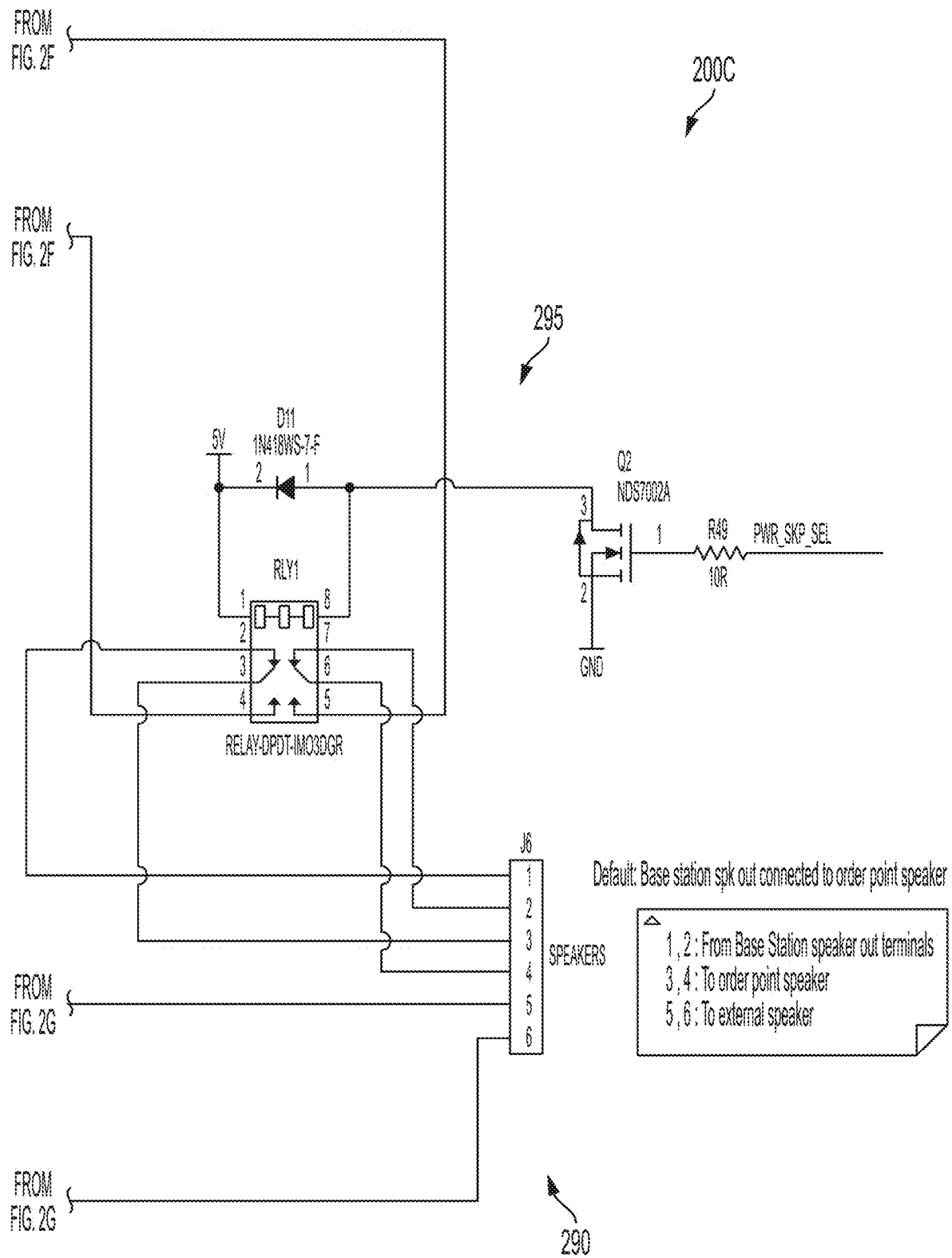
FIG. 2I illustrates schematically at least one example circuit diagram for electronic components of the bridge box shown in FIG. 1, in accordance with one or more implementations.

The relay switch 295, shown in FIG. 2I, can switch the signals received by the DT speaker 110. In the configuration shown (e.g., the default) the DT speaker 110 receives amplified audio signals from the base station 120. However, this can be changed based on signals received from the microcontroller 205, as shown, such that the DT speaker 110 receives amplified audio signals from the first audio amplifier IC 275. The second audio amplifier IC 280 is similar to the first audio amplifier 280 except that the second audio amplifier IC 280 connects directly to the output connector 290. The output connector can be any type of connector that can connect the relay switch 295 and the second audio output amplifier to any of the base station 120, the DT speaker 110, and the additional speaker 150.

Figure 3:
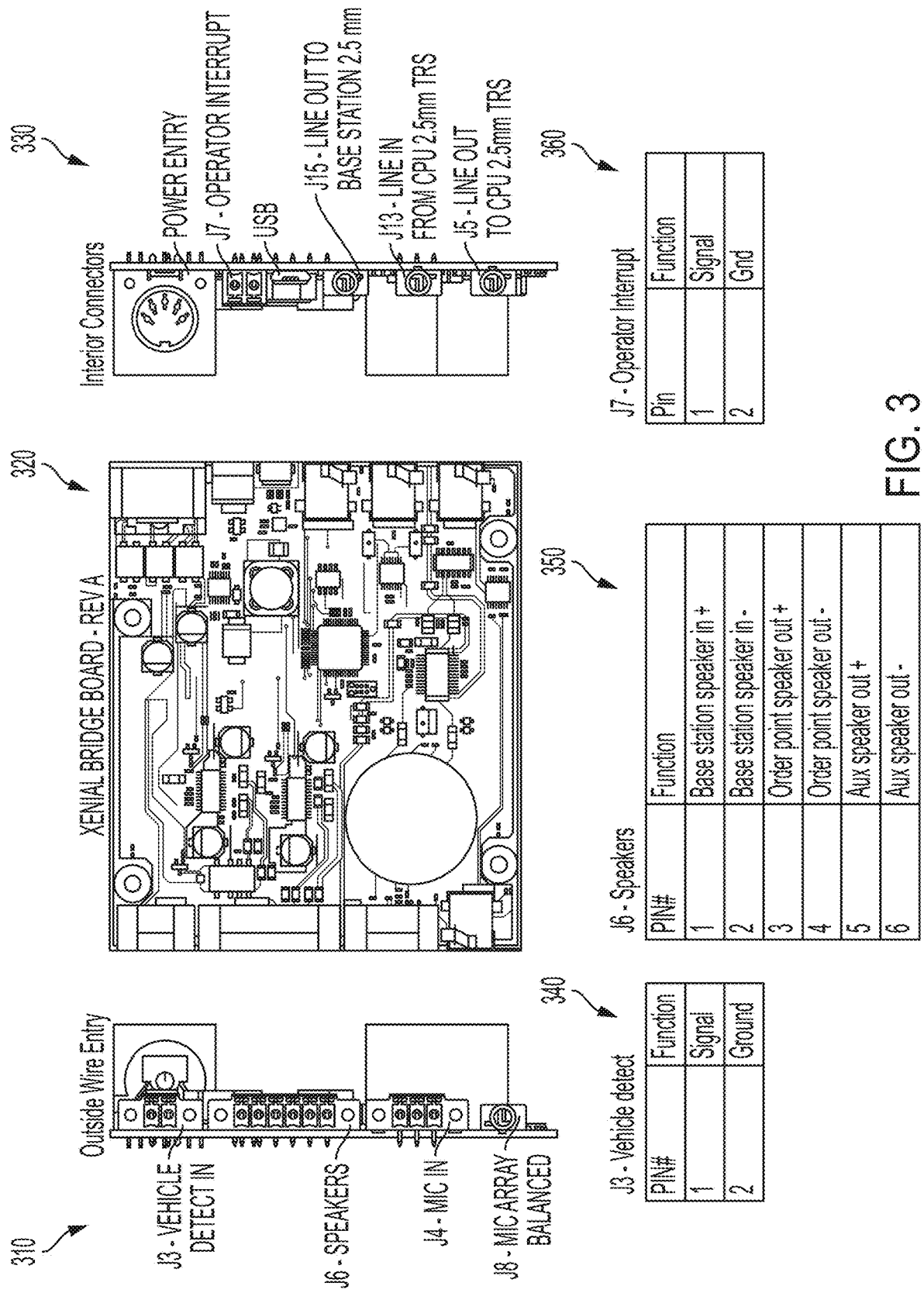
FIG. 3 illustrates front and side views of an example printed circuit board included in the example bridge box illustrated in FIG. 1, in accordance with one or more implementations.

Referring now to FIG. 3, illustrated is a first side view 310, a front view 320, and second side view 330 of an example printed circuit board (PCB) included in the bridge box illustrated in FIG. 1, in accordance with one or more implementations. As shown in the figure, the side view 310 includes connector interface J3 for the connector for the vehicle detection signal, a connector J6 for speakers, a connector J4 for a microphone input, a connector J8 for a balanced microphone array input. Pinouts for the connectors J3 and J6 are shown in the tables 340 and 350, respectively. The view 320 shows the completed PCB including all of the circuits shown in FIGS. 2A-2I. The view 330 includes a power connector, a connector J7 that receives an operator interrupt signal, e.g., to interrupt an automated voice assistant (an AI voice bot or "digital assistant"), a connector J15 that connects an audio line-out to the base station 120, a connector J13 that receives an audio line-in from the computer shown in FIGS. 4A and 4B, and a connector J5 that provides an audio line-out to the computer shown in FIGS. 4A and 4B. A pinout for the connector J7 is shown in the table 360.

Referring to FIG. 4A, illustrated is a top view of an example system 400 implementing the example bridge box illustrated in FIG. 1 integrated into a server rack, in accordance with one or more implementations. As shown, the system 400 that implements the bridge box 135 has a form factor that fits within a single server rack. Details of individual components in the system 400 are described herein in connection with FIG. 4B. Referring to FIG. 4B, illustrated is a top view of the example system 400 of FIG. 4A with highlighted and annotated portions, in accordance with one or more implementations.

As shown, the system 400 includes an 180 W power adapter that can power the components of the system 400. The power converter power can convert power signals from the 180 W power adapter to voltage signals suitable for the motherboard and the voice communications board. The motherboard can include one or more processors coupled to memory, and can perform any computationally intensive task described herein, including executing artificial intelligence or natural language processing models, among others. The voice communications board can be similar to that depicted in the view 320 of FIG. 3, and can coordinate audio signals between the components of the system 100 described herein above in connection with FIG. 1.

Processing Operations—Example 1

Figure 6:
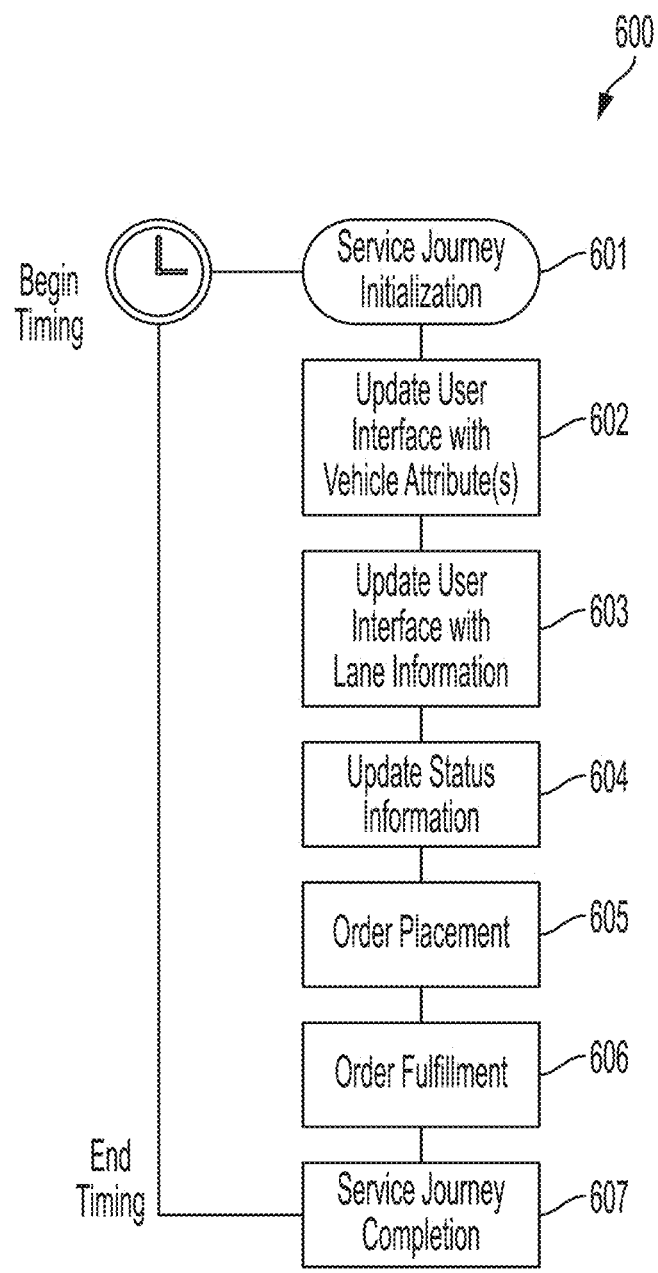
FIG. 6 is a flow diagram of a processing method, in accordance with one or more implementations.

FIG. 6 is a flow diagram illustrating a drive-thru order process 600 in accordance with at least one exemplary embodiment. In some embodiments, the processor 165 mentioned above is configured to carry out a plurality of processing operations in the process 600 in association with the system architecture described above.

At step 601, the processor 165 determines whether a vehicle has initiated a service journey, corresponding to when the vehicle enters the drive-thru (or the parking lot where the drive-thru is located) for order placement and/or order fulfillment. One or more of the cameras may be used to detect the vehicle at an entry point of the drive-thru course. The initialization of the service journey is defined by when the vehicle is identified at the entry point. An output (e.g., image data indicating the presence of a vehicle) from the one or more cameras is transmitted to the processor. The processor 165 determines, when the vehicle is at the entry point, at least one vehicle attribute and a time when a vehicle enters the drive-thru. The processor 165 is configured to initiate measurement of the timing of the service journey upon receiving the output from the one or more cameras.

For example, as indicated earlier, the processor 165 is configured to recognize one or more attributes relating to a vehicle, such as vehicle make, vehicle model, vehicle color, license plate, etc. when a vehicle drives into a parking lot or the drive-thru course of an establishment (e.g., an eatery) where the drive-thru is located. In some embodiments, the processor 165 may communicate with the third party API 185 to determine the one or more vehicle attributes. In particular, the third party API 185 may be a program with functionality including a database of known makes and models, and may incorporate machine learning or other artificial intelligence (AI) capabilities to determine a match between imagery captured by one or more of the cameras in the drive-thru and a corresponding vehicle make and model, and/or a make, model and color. In some embodiments, the API may utilize commercially available software to detect an object type (car, truck, etc.), logos, colors, and other vehicle attributes.

In some embodiments, one or more of the vehicle attributes such as the make, model and color are determined with the aid of a computer vision API configured to train a custom machine learning model. In particular, images from the one or more cameras may be transmitted (uploaded) to a model. The model is configured to operate at least in a training phase and a runtime phase. In the training phase, given a plurality of images, recognition and identification of vehicle attributes (e.g., that a vehicle has a particular make or color) are "learned" by the model, where a library of vehicle attributes may be used to classify vehicles detected in the image data. In the runtime phase, images are received by the model and processing by the model occurs that yields an identification of one or more of the vehicle attributes. In some embodiments, the model may be based on a Vision API (Cloud Vision API) by Alphabet Inc. of Mountain View, Calif.

As just one example, the processor 165 may use the information from the cameras and the third party API 185 to determine that a maroon-colored four-door sedan has begun its service journey at noon. More specifically, the processor 165 may determine that the sedan has entered the parking lot at 11:59 am and reached the entry of the drive-thru course at noon. The information from the camera may be delivered to the processor and processed within a predetermined time period (e.g., within about 2 seconds, within about 5 seconds, or within about 10 seconds). The processor 165 assigns a unique vehicle identification (ID) to the vehicle.

At step 602, the user interface engine 190 of the processor 165 updates the user interface 195 by adding the identified vehicle attribute information. In doing so, the user interface engine 190 situates the vehicle identified at step 601 in the virtual environment that simulates the drive-thru. More specifically, the user interface engine 190 instantiates a simulation (a virtual model) of the identified vehicle, so that a user interacting with the user interface 195 is presented with information indicating the presence of the vehicle in the virtual environment (thereby notifying the user that a vehicle is present at the drive-thru itself). For example, once the vehicle is identified, the user interface engine 190 may cause a depiction, such as an animation, of the vehicle to appear in the user interface 195.

In some embodiments, the depiction may reflect one or more of the detected vehicle attributes (e.g., if a maroon sedan is identified having a known make and model, the corresponding animation would have the corresponding color and car type). Each time a vehicle is identified in terms of the attributes of a make, model and color, the corresponding attribute information is stored in a database (e.g., log 172) to be summoned for animation purposes for the visualization in the user interface 195 and for purposes of identifying a returning customer. Further, in some embodiments, the vehicle attribute information in the log 172 may be correlated with online order information accessible to the bridge box 135 to associate an online order with a detected vehicle. For example, a customer who has placed a first online order (including vehicle information) and appears at the drive-thru in a maroon four-door sedan will then be logged in log 172 as being associated with that particular vehicle. A vehicle occupant who arrives in the maroon four-door sedan is presumed by the processor 165 to be the customer who placed the online order (a presumptive customer). The processor 165 is configured to recognize the customer based on the appearance of the same vehicle when the customer returns to the drive-thru for a subsequent online order.

At step 603, the user interface engine 190 further updates the user interface 195 by incorporating lane information relating to the vehicle whose attributes were incorporated at step 602. In particular, for a drive-thru having two lanes, the user interface engine 190 determines whether the virtual environment should instantiate a virtual model of the vehicle in either a first lane or a second lane of the two lanes in addition to the approximate location of the vehicle in the first or second lane as gleaned from the cameras 180.

By correlating position information of the vehicle to timing information (e.g., from a timer capability of the processor 165 or a timer of the bridge box 135), the vehicle may be accurately tracked in real time. For example, the virtual environment may account for the vehicle being in Lane 1 and having a position of $\{x1, x2, x3, \ldots xn\}$ at a time $\{t1, t2, t3, tn\}$, where $\{x1, t1\}$ correspond to a position and time when the vehicle enters Lane 1. In some embodiments, the animation or visualization of the vehicle on the user interface 195 is configured to be updated as the vehicle progresses through its service journey. In some embodiments, the user interface 195 is configured to display simultaneously information associated with a plurality of vehicles in one or more lanes and to update the associated visualizations of each vehicle over time.

Figure 11:
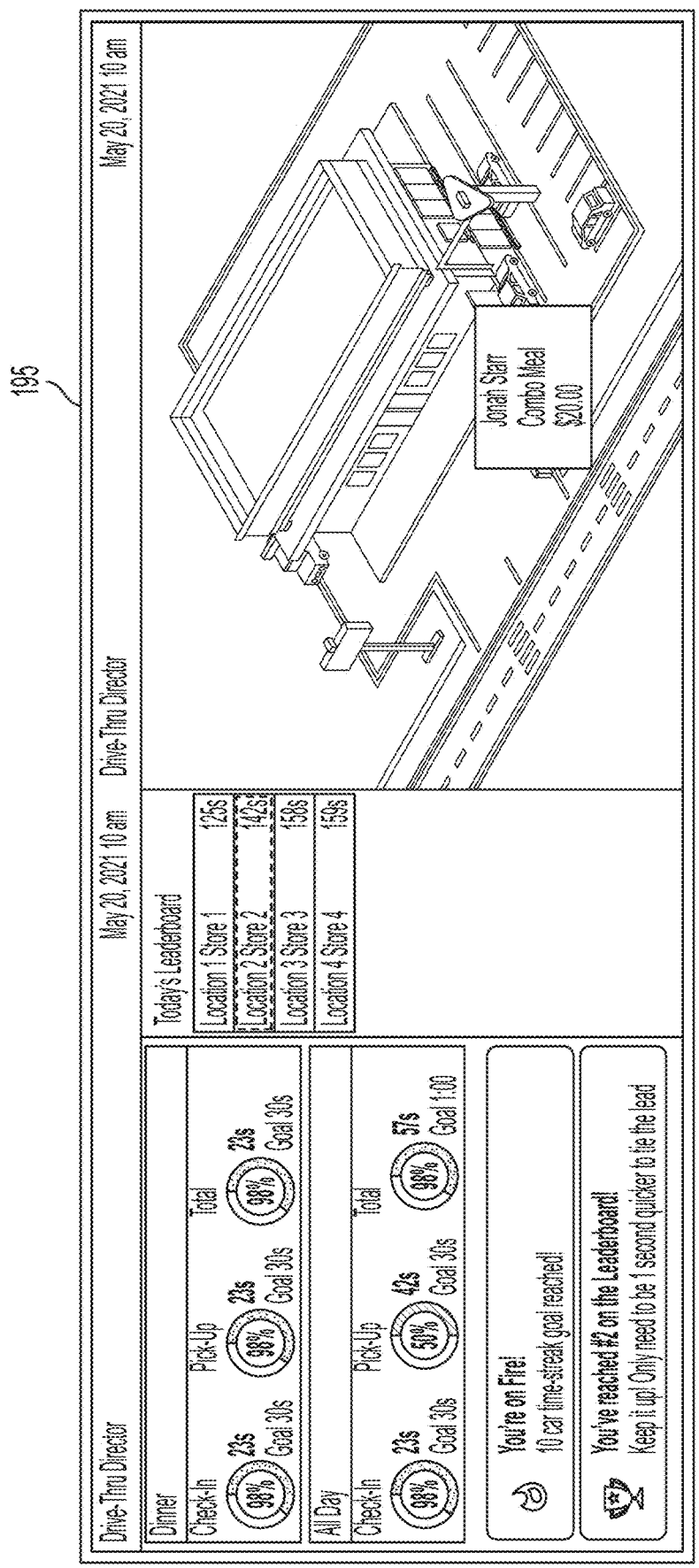
FIG. 11 is a depiction of a user interface, in accordance with one or more implementations.

FIG. 11 depicts an exemplary user interface 195 including timing information and an identified vehicle of a customer as detected by at least one camera 180. The timing information may be depicted by the user interface 195 in terms of elapsed time relative to the start of timing (e.g., the start of the service journey) and/or the time associated with particular tasks (e.g., from the start of order placement to order fulfillment). In some embodiments, the timing information may be supplemented by warnings or notifications when the elapsed total time or the elapsed time for a particular task exceeds a defined service goal or benchmark or is expected to exceed that goal or benchmark.

For example, if a benchmark is set that a vehicle occupant who orders a single beverage should receive that beverage in under a minute, the user interface 195 may depict a warning when the 55 second mark is reached. The user interface 195 may also depict information relating to the departure of a vehicle from the ordering process, such as when a vehicle drives off after initiating an order but before payment, or without initiating an order. As shown in FIG. 11, the user interface 195 may display comparative timing information for a plurality of eatery locations as well as comparative information across time periods (e.g., actual elapsed time versus benchmarks for dinner time or all day).

At step 604, the user interface engine 190 may assign an order status to the vehicle. The order status may be one of the following statuses, for example: "waiting for service," "waiting for order," "empty order" and "new customer." In this manner, the process 600 constructs a virtual environment whereby the information shown to the user of the user interface 195 is accurate and timely. This provides eatery personnel with enhanced awareness of aspects of the drive-thru, including vehicle status, vehicle position, order status, etc. Such awareness is in turn conducive to more accurate and quicker order fulfillment.

Moreover, by communicating, via the user interface 195, information relating to the order status, the user may be prompted to take action in furtherance of order fulfillment and/or other commercial activities of interest. For example, when the status is "waiting for service," the user may then determine whether a runner or other worker should interact with the vehicle, e.g., by greeting the vehicle occupants and initiating a dialogue to solicit requests for items of food and/or beverage for purchase. The runner may be wearing a headset and the bridge box 135 may capture audio from the headset as an event indicating that the greeting has occurred, which is then duly logged in the virtual environment of the processor 165 and used to update the user interface 195.

In some embodiments, when the status is "waiting for order," the user interface 195 may prompt a user to check to see how long the vehicle has been waiting for the order and to interface with kitchen staff or other personnel as needed. When the status is "empty order," the vehicle has either not yet been involved in order placement or has left the drive-thru without initiating or completing an order. When the status is "new customer," the processor 165 may compile information relating to the vehicle (e.g., make, model, order information) to create a customer profile that may also contain information stored e.g., in log 172, such as historical meal ordering history. The order status is associated with an order identification (ID) which is correlated to the unique ID assigned to the vehicle.

At step 605, order placement is initiated. The order placement may take place when the vehicle occupant interacts at the drive-thru window (e.g., by communicating order requests to a worker located indoors). In some embodiments, however, the order placement may occur not when the vehicle is at the drive-thru window, but at a distance from the drive-thru window itself, e.g., when the vehicle is in the parking lot or at a position in the drive-thru away from the window. The order placement may be initiated when a runner approaches the vehicle (not at the drive-thru window) and solicits orders. The vehicle occupant then pays for the order. An order confirmation may be depicted in some embodiments in a display 50 adjacent to or integrated with the digital menu board 46. As each item is ordered by a vehicle occupant, the item information is received and processed by a device on which the user interface 195 is depicted (e.g., a handheld device for the runner or a terminal for the operator at the drive-thru window). The user interface 195 updates to reflect the received order information. For example, the status may change from "waiting for order" to "order placed."

At step 606, order fulfillment occurs when the items requested by the vehicle occupant are delivered to the vehicle occupant. The fulfillment may take place at the drive-thru window or at a location other than the drive-thru window, e.g., anywhere in the parking lot of the eatery. For example, a runner who takes order information for placement may also deliver orders to waiting vehicles. The order is fulfilled once the vehicle occupant takes delivery of the ordered goods. The user interface 195 updates to indicate the status of "fulfilled."

At step 607, the service journey of the vehicle is completed when the vehicle leaves the drive-thru, which is detectable in some embodiments by one or more of the cameras 180 being located at an exit of the drive-thru. If a vehicle whose status is "fulfilled" leaves the drive-thru, the user interface 195 removes the vehicle from the visualization. Further, the user interface 195 removes the vehicle from the visualization if the order is cancelled or voided. The timer which began to run at the start of the service journey at step 601 ceases timing at order completion. In some embodiments, the DT Order Taker 130 may receive a notification from the processor 165 of any unfulfilled order that is being tracked for a vehicle departing the drive-thru.

Figure 8:
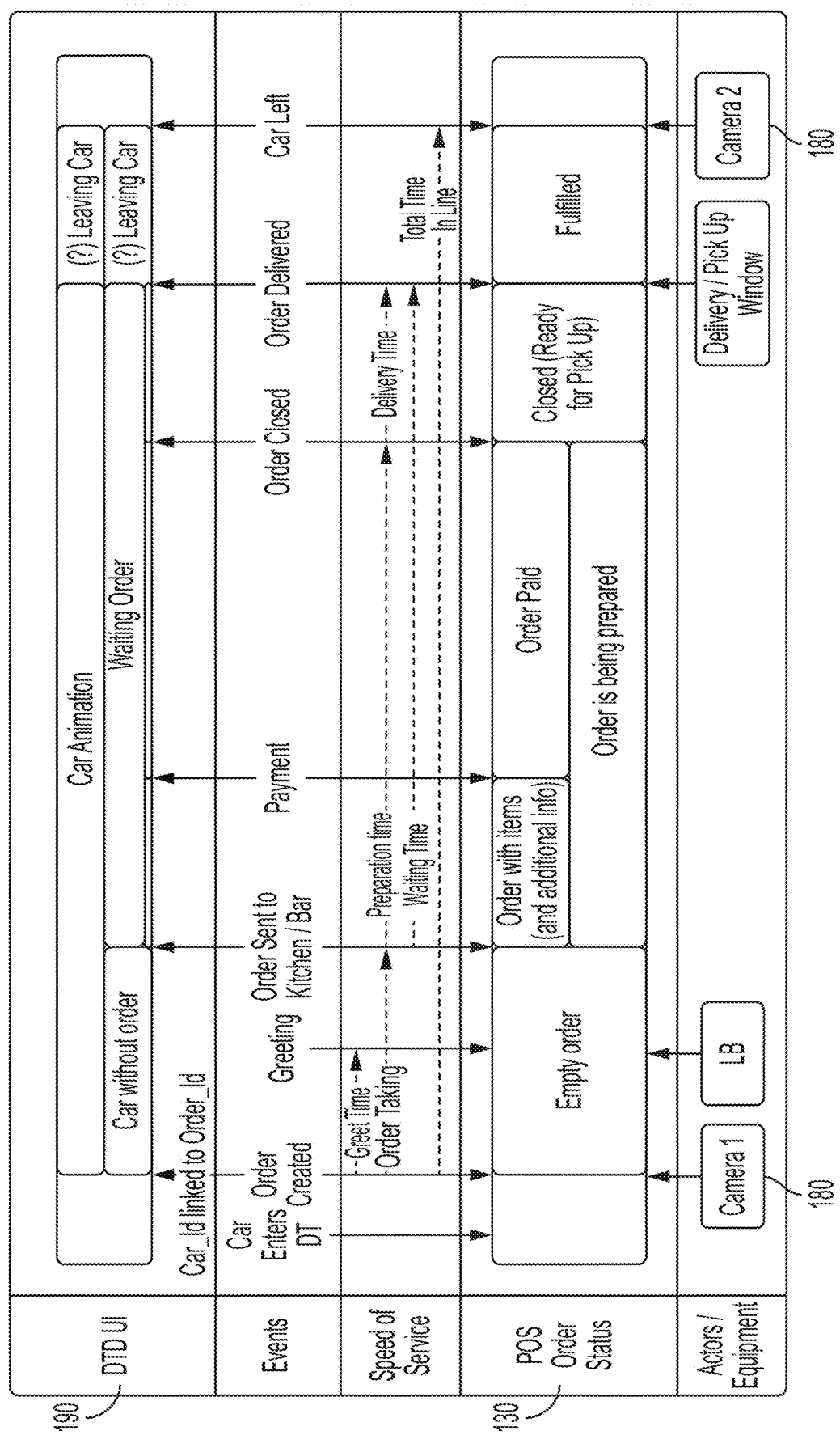
FIG. 8 is a depiction of a system including information to be accessible via a user interface, in accordance with one or more implementations.

FIG. 8 is a depiction of a system including information to be accessible via a user interface, in accordance with one or more implementations. In particular, FIG. 8 depicts information compiled by the user interface engine 190 and representative of the virtual environment constructed by the processor 165 in connection with process 600. As reflected in FIG. 8, at step 601, one of the cameras 180 detects a vehicle as soon as the vehicle enters the drive-thru. The camera 180 generates a signal providing a notification to the processor 165 and/or the DT Order Taker 130.

Using the third party API 185 and/or the library of vehicles (an animation library) based on information stored in log 172, the processor 165 recognizes vehicle type and populates a vehicle ID (e.g., "car_id" in FIG. 8). The DT Order Taker 130 starts an empty order and assigns an order ID (an order identifier, e.g., "order_id" in FIG. 8). The DT Order Taker 130 communicates with the processor 165 to retrieve vehicle information. Each event shown in FIG. 8 may be logged and its associated timing may be quantified using the processor 165 to accurately convey how long each activity takes. In this manner, the information in the user interface 195 reflects the actual speed-of-service associated with the order.

Accordingly, the vehicle ID ("car_id") is linked with the order identification ("order_id") in the user interface engine 190. The timing of the processes begins at the time when the vehicle enters the drive-thru. The user interface 195 depicts a visualization of the vehicle, timing information, vehicle location information, and order status. In some embodiments, an eatery worker (e.g., a runner or line buster LB) intervenes in the queue of vehicles waiting to reach the drive-thru window, and may interact with a waiting vehicle prior to the arrival of that vehicle at the drive-thru window.

For example, an eatery worker may greet the vehicle occupant and begin order placement shortly after arrival in the drive-thru. In this manner, the total wait time—including the time until greeting, following by order taking, followed by preparation time once the order is created and sent to the eatery order preparation area (e.g., a kitchen and/or bar) to be readied, followed by delivery time—includes a greater proportion of time from when the vehicle occupant has first interacted with eatery personnel to when the vehicle leaves the drive-thru. The total time in line—including the waiting time corresponding to the sum of the preparation time and the delivery time—is monitored and visualized by the user interface engine 190.

Processing Operations—Example 2

Figure 7:
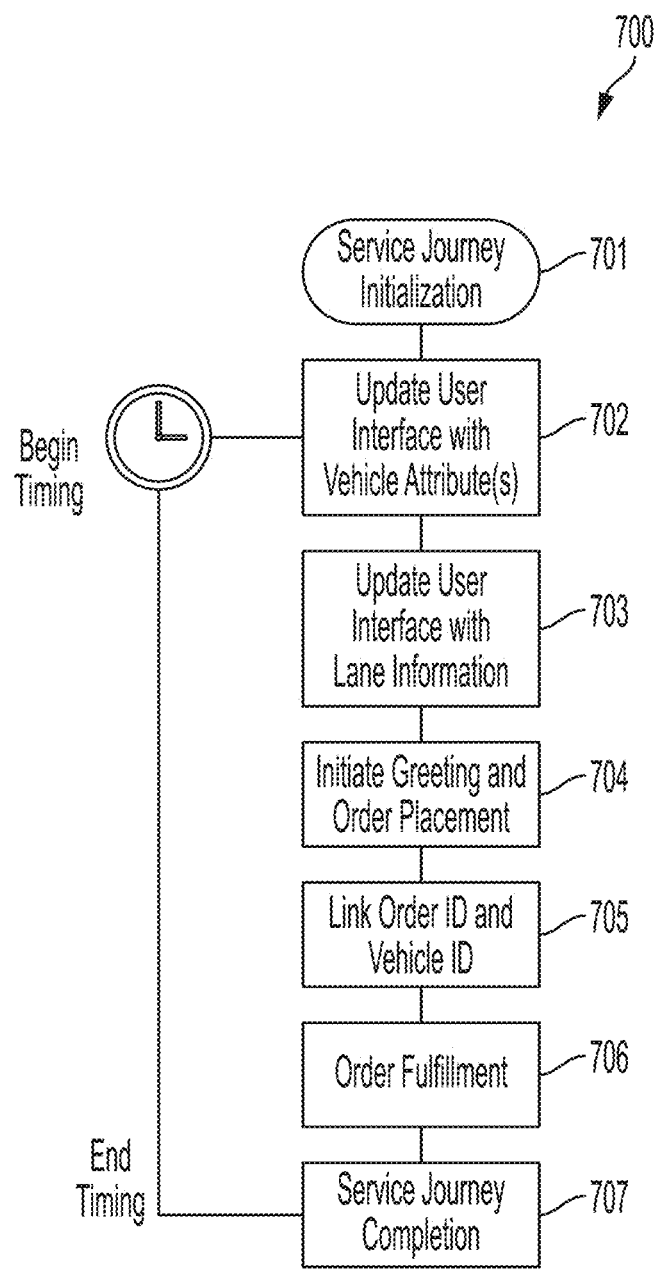
FIG. 7 is a flow diagram of a processing method, in accordance with one or more implementations.

FIG. 7 is a flow diagram illustrating a drive-thru order process 700 in accordance with at least one exemplary embodiment. In some embodiments, the processor 165 mentioned above is configured to carry out a plurality of processing operations in the process 700 in association with the system architecture described above. Process 700 includes certain similar aspects to process 600; similar aspects are not repeated in the following description so as to avoid redundancy.

At step 701, the processor 165 causes the service journey initialization to begin once a vehicle is detected (e.g., by the one or more cameras 180) at the drive-thru. At step 702, information from third party APIs 185 and/or an animation library of vehicles (e.g., a library as may be stored in log 172) is used to populate a vehicle ID (a vehicle identifier, e.g., "car_id" in FIG. 8) for the vehicle. At step 702, timing of the service journey for the vehicle may be initiated on the user interface 195 by the processor 165. That is, the processor 165 begins timing the vehicle once identified by the one or more cameras 180 and causes the user interface engine 190 to depict the timing information on the user interface 195.

At step 703, when the vehicle attributes are incorporated by the user interface engine 190 into the user interface 195 or at a different point in time, the user interface engine 190 may also populate vehicle location information (e.g., a specific lane number and/or a relative position with respect to predefined intervals or markers of the drive-thru course) in the user interface 195. At step 704, the user interface 195 may prompt a user (e.g., an eatery worker) to engage with one or more vehicle occupants of the vehicle, e.g., by approaching the vehicle before the vehicle reaches the drive-thru window and greeting the occupant(s). Upon greeting, the eatery worker then begins to assist the occupant(s) with placing an order. Payment information is captured by the DT Order Taker 130 which is in communication with processor 165.

Order information for the order being placed is captured via the DT Order Taker 130. At step 705, the order information from the DT Order Taker 130 is linked with vehicle information from the processor 165. The visualization of the user interface 195 depicts the order ID and vehicle ID, along with status and timing information. At step 706, order fulfillment is accomplished when the order is delivered to the vehicle occupant(s), either at the drive-thru window or earlier via delivery from an eatery worker such as a runner. At step 707, the service journey is completed when the vehicle exits the drive-thru, an event captured by the user interface engine 190 and resulting in the removal of the vehicle from the visualization in the user interface 195. The timing of the vehicle ceases once the vehicle exits the drive-thru.

Figure 9:
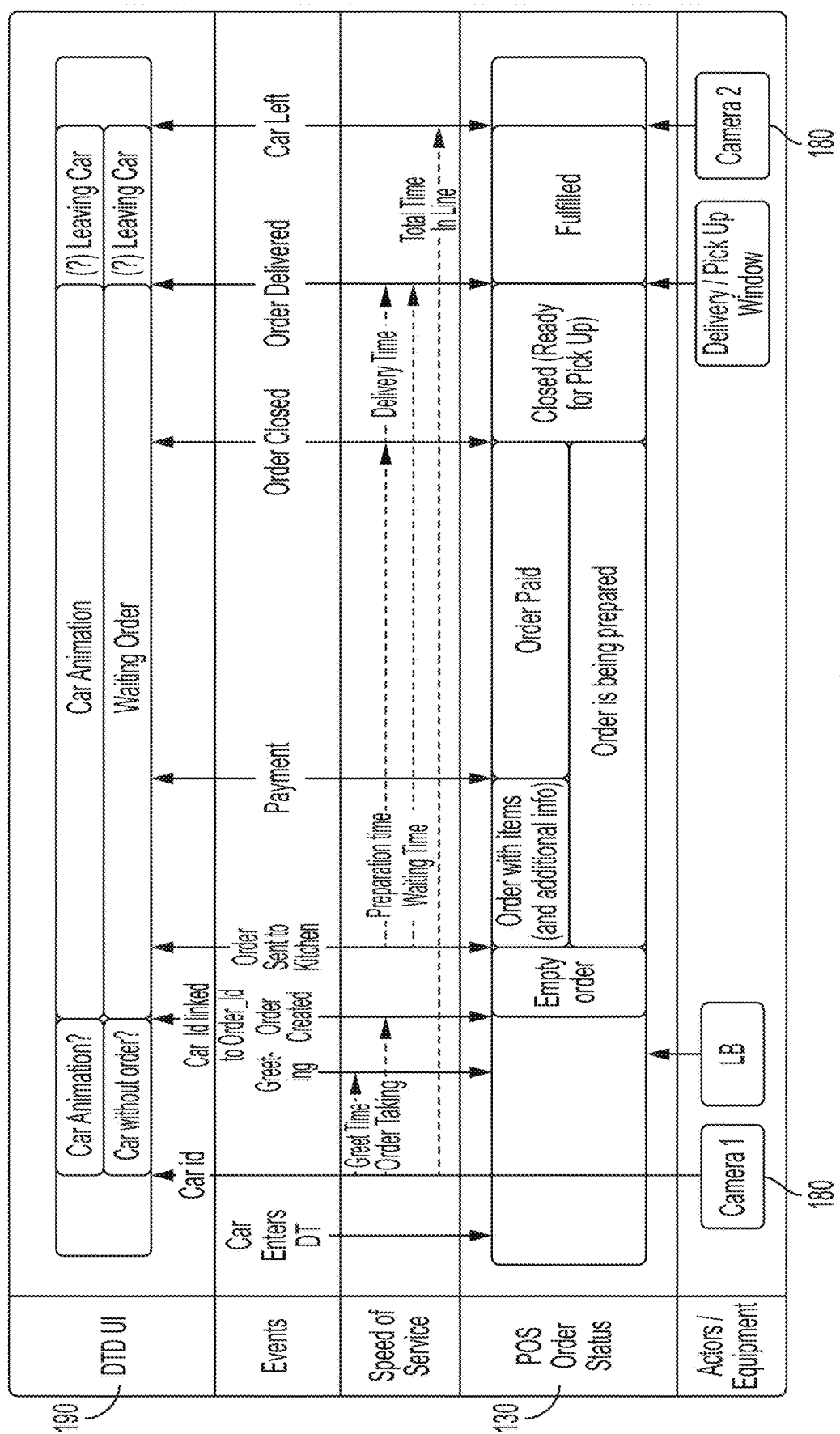
FIG. 9 is a depiction of a system including information to be accessible via a user interface, in accordance with one or more implementations.

FIG. 9 is a depiction of a system including information to be accessible via a user interface, in accordance with one or more implementations. In particular, FIG. 9 depicts information compiled by the user interface engine 190 and representative of the virtual environment constructed by the processor 165 in connection with process 700. In some embodiments, one or more vehicles (e.g., having "car ID" in FIG. 9) without associated order information (e.g., without any "Order_id" as shown in FIG. 9) may be depicted by the user interface 195 (e.g., to accurately reflect the presence of vehicles in the drive-thru or parking lot even when those vehicles are not engaged (or have not yet engaged) in ordering at the drive-thru), in addition to regular drive-thru users. Including such vehicles may help to identify to the eatery worker which vehicles do not need to be serviced for order placement and/or may play a role in assessing performance (e.g., by indicating relative traffic or throughput at a given site). In particular, accounting for vehicular traffic in this manner may provide an indication of how many vehicles utilize the drive-thru as an "escape" lane to exit the parking lot, for example.

Additional Information

Implementations of the subject matter and the operations described in this specification can be implemented in digital electronic circuitry, or in computer software embodied on a tangible medium, firmware, or hardware, including the structures disclosed in this specification and their structural equivalents, or in combinations of one or more of them. Implementations of the subject matter described in this specification can be implemented as one or more computer programs, e.g., one or more components of computer program instructions, encoded on computer storage media for execution by, or to control the operation of, data processing apparatus. The program instructions can be encoded on an artificially-generated propagated signal, e.g., a machine-generated electrical, optical, or electromagnetic signal that is generated to encode information for transmission to suitable receiver apparatus for execution by a data processing apparatus.

A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can include a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The terms "data processing apparatus", "data processing system", "client device", "computing platform", "computing device", "computer," or "device" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatuses can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The elements of a computer include a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube), plasma, or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can include any form of sensory feedback, e.g., visual feedback, auditory feedback, or tactile feedback; and input from the user can be received in any form, including acoustic, speech, or tactile input.

While operations are depicted in the drawings in a particular order, such operations are not required to be performed in the particular order shown or in sequential order, and all illustrated operations are not required to be performed. Actions described herein can be performed in a different order.

The separation of various system components does not require separation in all implementations, and the described program components can be included in a single hardware or software product.

Having now described some illustrative implementations, it is apparent that the foregoing is illustrative and not limiting, having been presented by way of example. In particular, although many of the examples presented herein involve specific combinations of method acts or system elements, those acts and those elements may be combined in other ways to accomplish the same objectives. Acts, elements, and features discussed in connection with one implementation are not intended to be excluded from a similar role in other implementations.

The phraseology and terminology used herein is for the purpose of description and should not be regarded as limiting. The use of "including," "comprising," "having," "containing," "involving," "characterized by," "characterized in that," and variations thereof herein is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

As used herein, the terms "about" and "substantially" will be understood by persons of ordinary skill in the art and will vary to some extent depending upon the context in which they are used. If there are uses of the term which are not clear to persons of ordinary skill in the art given the context in which it is used, "about" will mean up to plus or minus 10% of the particular term.

Any references to implementations or elements or acts of the systems and methods herein referred to in the singular may also embrace implementations including a plurality of these elements, and any references in plural to any implementation or element or act herein may also embrace implementations including only a single element. References in the singular or plural form are not intended to limit the presently disclosed systems or methods, their components, acts, or elements to single or plural configurations. References to any act or element being based on any information, act, or element may include implementations where the act or element is based at least in part on any information, act, or element.

Any implementation disclosed herein may be combined with any other implementation or embodiment, and references to "an implementation," "some implementations," "one implementation," or the like are not necessarily mutually exclusive and are intended to indicate that a particular feature, structure, or characteristic described in connection with the implementation may be included in at least one implementation or embodiment. Such terms as used herein are not necessarily all referring to the same implementation. Any implementation may be combined with any other implementation, inclusively or exclusively, in any manner consistent with the aspects and implementations disclosed herein.

The indefinite articles "a" and "an," as used herein in the specification and in the claims, unless clearly indicated to the contrary, should be understood to mean "at least one."

References to "or" may be construed as inclusive so that any terms described using "or" may indicate any of a single, more than one, and all the described terms. A reference to "at least one of 'A' and 'B'" can include only 'A', only 'B', as well as both 'A' and 'B'. Such references used in conjunction with "comprising" or other open terminology can include additional items.

Where technical features in the drawings, detailed description, or any claim are followed by reference signs, the reference signs have been included to increase the intelligibility of the drawings, detailed description, and claims. Accordingly, neither the reference signs nor their absence has any limiting effect on the scope of any claim elements.

The systems and methods described herein may be embodied in other specific forms without departing from the characteristics thereof. The foregoing implementations are illustrative rather than limiting of the described systems and methods. The scope of the systems and methods described herein is thus indicated by the appended claims, rather than the foregoing description, and changes that come within the meaning and range of equivalency of the claims are embraced therein.

What is claimed is:

1. A system for automating a drive-thru, comprising:
   electronic circuitry configured to (1) receive audio information from a source, the audio information comprising a customer's voice signal at a drive-thru as customer audio information, (2) transmit the customer audio information to a voice recognition processor programmed to carry out voice recognition processing and remote from the electronic circuitry, (3) receive conversational prompts from the voice recognition processor, and (4) cause outputting of the conversational prompts to the customer,
   the electronic circuitry comprising
      (i) an audio input terminal configured to receive audio information from the source;

(ii) an audio output terminal configured to output audio information to the drive-thru;
(iii) at least one video input terminal configured to receive video information from a first detector, a second detector, and a third detector disposed at different locations at the drive-thru, including an entry point of a course including the drive-thru, an intermediate point along the course, and an exit of the course;
(iv) a video output terminal configured to output video information;
(v) a natural language processing input terminal configured to receive information from the voice recognition processor,
the electronic circuitry being configured to allow communication with existing drive-thru base station equipment.

2. The system as set forth in claim 1, further comprising:
the voice recognition processor, wherein the voice recognition processor is configured to perform at least one of natural language processing, machine learning, or artificial intelligence.

3. The system as set forth in claim 1, further comprising:
the voice recognition processor, wherein the voice recognition processor is located more than 1 kilometer from the electronic circuitry.

4. The system as set forth in claim 1, further comprising the voice recognition processor, wherein
the electronic circuitry is configured to determine whether a condition exists for offering an alternative product other than a product initially selected by the customer based on (i) a quantity of items ordered by the customer, and (ii) a number of vehicle occupants detected in a vehicle of the customer, and
the voice recognition processor is configured such that when the electronic circuitry determines that the condition exists, the voice recognition processor generates an offer to provide the alternative product.

5. The system as set forth in claim 1, wherein
the source is a first source comprising one or more directional microphone arrays where the customer audio information is received;
the electronic circuitry is further configured to receive employee audio information from a second source; and
the electronic circuitry is configured to detect when a customer begins speaking from the customer audio information from the first source and to filter out employee chatter from the employee audio information from the second source.

6. The system of claim 1, wherein the electronic circuitry is configured to permit selection among a plurality of audio parameters in order to process audio information associated with a plurality of drive-thru configurations having a differing number of lanes.

7. The system of claim 2, wherein the electronic circuitry is configured to perform first audio processing on at least part of the audio information and the voice recognition processor is configured to perform second audio processing on at least part of the audio information.

8. A system for automating a drive-thru, comprising:
at least one camera positioned at a drive-thru, the drive-thru being on a course defined by an entry point and a departure point; and
a processor system configured to (1) receive image information from the at least one camera, (2) identify at least one vehicle attribute of a vehicle from the image information, and (3) link the at least one vehicle attribute with a food and/or beverage order
the processor system being configured to
(i) initiate timing of an encounter when the vehicle is detected by the at least one camera to enter the course at the entry point
(ii) update a virtual environment of the processor system to reflect the presence of the vehicle and provide a visualization of the detected vehicle on a user interface in response to detecting the entry of the vehicle at the entry point
(iii) update the virtual environment based on information relating to one or more order tasks and based on a change in a vehicle location in the course; and
(iv) terminate timing and terminate the visualization of the vehicle in the user interface when the vehicle is detected by the at least one camera to exit the course at the departure point.

9. The system as set forth in claim 8, wherein the processor system is configured to link the at least one vehicle attribute with a food and/or beverage order placed at the drive-thru.

10. The system as set forth in claim 8, wherein the processor system is configured to link the at least one vehicle attribute with a food and/or beverage order placed online based on a vehicle attribute in the online order.

11. The system as set forth in claim 8, wherein the at least one vehicle attribute comprises at least one of a vehicle make, a vehicle model, or a vehicle color.

12. The system of claim 8, wherein the processor system is further configured to terminate the visualization in response to order information indicating that an order is cancelled or voided.

13. A method comprising:
detecting, by a first detector, a vehicle on a course;
identifying at least one attribute of the vehicle;
transmitting the at least one attribute and timing information corresponding to a time when the vehicle is detected to a processor;
displaying, by the processor, information on a user interface including a depiction of the detected vehicle having the at least one attribute and the timing information;
associating a vehicle identifier relating to the at least one attribute with an order identifier relating to an order for food and/or beverage, and depicting a representation of both of the vehicle identifier and the order identifier in the user interface;
updating the user interface in response to at least a change in an order status for the order for food and/or beverage associated with the vehicle, and
displaying, via the user interface, a benchmark relating to servicing of the order for food and/or beverage and providing, by the user interface, a notification when an elapsed time for an activity associated with the order exceeds the benchmark.

14. The method of claim 13, wherein the at least one attribute comprises at least one of a vehicle make, a vehicle model, or a vehicle color.

15. The method of claim 13, further comprising receiving audio data relating to the order; processing the audio data; and offering an alternative product to an occupant of the vehicle from a product identified in the order.

16. The method of claim 13, further comprising updating the user interface in response to an interaction between at least one occupant of the vehicle and an eatery worker at a location other than a drive-thru of the course.

17. The method of claim 13, wherein the order is an online order, and the processor is configured to associate a vehicle identifier relating to the at least one attribute with the online order so as to identify an occupant of the vehicle as a presumptive customer who placed the online order.

18. The method of claim 13, further comprising transmitting information relating to the order to a natural language processor and to the user interface.

19. The method of claim 13, further comprising depicting, on the user interface, a vehicle location, the at least one vehicle attribute, the timing information and the order status for each of a plurality of vehicles on the course.

20. The method of claim 13, further comprising displaying, together with the benchmark, comparative information relating to a plurality of eateries other than an eatery where the course is located.

\* \* \* \* \*